(12) United States Patent
Lipka et al.

(10) Patent No.: US 8,693,460 B2
(45) Date of Patent: Apr. 8, 2014

(54) TECHNIQUE FOR SYNCHRONIZING A TERMINAL DEVICE WITH A WIRELESS NETWORK

(75) Inventors: Dietmar Lipka, Berg (DE); Stefan Mueller-Weinfurtner, Nürnberg (DE); Steffen Reinhardt, Nürnberg (DE); Udo Wachsmann, Schwabach (DE)

(73) Assignee: Unwired Planet, LLC, Reno, NV (US)

( * ) Notice: Subject to any disclaimer, the term of this patent is extended or adjusted under 35 U.S.C. 154(b) by 302 days.

(21) Appl. No.: 13/061,908

(22) PCT Filed: Sep. 5, 2008

(86) PCT No.: PCT/EP2008/007278
§ 371 (c)(1),
(2), (4) Date: Mar. 9, 2011

(87) PCT Pub. No.: WO2010/025753
PCT Pub. Date: Mar. 11, 2010

(65) Prior Publication Data
US 2011/0176535 A1   Jul. 21, 2011

(51) Int. Cl.
*H04J 3/06* (2006.01)
(52) U.S. Cl.
USPC ........... 370/350; 370/352; 370/503; 370/510; 370/509; 370/514
(58) Field of Classification Search
USPC .......................... 370/350, 509, 503, 324, 514
See application file for complete search history.

(56) References Cited

U.S. PATENT DOCUMENTS

| | | | |
|---|---|---|---|
| 6,088,382 A | 7/2000 | Maru | |
| 7,292,551 B2 | 11/2007 | Lim et al. | |
| 2003/0048810 A1 | 3/2003 | Kermode et al. | |
| 2003/0152043 A1 | 8/2003 | Geers | |
| 2004/0105512 A1 | 6/2004 | Priotti | |
| 2006/0233225 A1* | 10/2006 | Omoto | 375/149 |
| 2007/0071123 A1 | 3/2007 | Charbit | |
| 2007/0253319 A1 | 11/2007 | Jansen | |
| 2007/0298780 A1 | 12/2007 | Lindoff et al. | |
| 2008/0025257 A1* | 1/2008 | Laroia et al. | 370/329 |
| 2009/0054094 A1* | 2/2009 | Demir et al. | 455/502 |
| 2009/0233591 A1* | 9/2009 | Zhu et al. | 455/418 |
| 2010/0002678 A1* | 1/2010 | Terabe et al. | 370/350 |

(Continued)

FOREIGN PATENT DOCUMENTS

EP          0709977 A2      5/1996

*Primary Examiner* — Asad Nawaz
*Assistant Examiner* — Khaled Kassim
(74) *Attorney, Agent, or Firm* — Nixon & Vanderhye P.C.

(57) ABSTRACT

The invention relates to a technique for controlling a synchronization of a terminal device (10) with a wireless network, e.g. an LTE network, wherein data are transmitted as a continuous data signal on a radio interface (11, 12) while being processed block-wise in the terminal (10). A method embodiment of the technique for achieving at least a downlink (11) synchronization comprises establishing a time-address mapping (TAM, 36) indicative of an association of a reference time value of an internal clock (32) with a reference address in the reception data buffer (16); determining an address of data samples representing the received data block in the reception data buffer (16) based on the time-address mapping; and initiating a block-wise reading of the data block from the reception data buffer (16) based on the determined address.

19 Claims, 12 Drawing Sheets

(56) References Cited

U.S. PATENT DOCUMENTS

2010/0080181 A1* 4/2010 Yamada et al. ............... 370/329
2010/0157940 A1* 6/2010 Shitara ......................... 370/331
2010/0329365 A1* 12/2010 Li et al. ........................ 375/259
2011/0058529 A1* 3/2011 Uemura ........................ 370/331

* cited by examiner

TECHNIQUE FOR SYNCHRONIZING A TERMINAL DEVICE WITH A WIRELESS NETWORK

TECHNICAL FIELD

The invention relates to a technique for controlling a synchronization of a terminal device with a wireless network over a radio interface. More particularly, the invention relates to a synchronization of a mobile terminal with, e.g., an LTE network, wherein data are typically transmitted as a continuous data signal on the radio interface while being processed block-wise in the terminal.

BACKGROUND

In the mobile LTE (Long Term Evolution) networks currently standardized by the 3GPP ($3^{rd}$ Generation Partnership Project), the data to be transmitted (user data and signalling data) over the radio interface are grouped into data blocks, which are processed, e.g. encoded and block-wise transformed, and provided as data frames for the transmission. The frames are then transmitted as a continuous stream on the radio interface. Regarding the downlink direction, for example, in a terminal device the received continuous data signal has to be processed block-wise in order to recover the original data. Specifically, the data samples obtained from the received signal have to be sub-divided into data blocks, e.g. OFDM (Orthogonal Frequency Division Multiplex) symbols which then are processed by an FFT (Fast Fourier Transformation) and are further decoded in order to arrive at the original data blocks, which then are concatenated to form a data output. In the uplink direction, blocks of data symbols have to be encoded and modulated to generate SC-FDMA (Single Carrier Frequency Division Multiple Access) symbols, which then have to be concatenated in an appropriate way to form a continuous signal stream.

In order to achieve synchronization with the serving cell, the terminal has to synchronize with the frame pattern as provided by the radio base station in the downlink and uplink directions. For maintaining the synchronization when moving relative to the base station, the terminal device has to perform timing adjustments for both downlink and uplink.

A technique for synchronizing the mobile terminal with the network thus requires that the timing of the internal or "baseband" processing related to data blocks which have been received or which have to be transmitted must be decoupled to an appropriate degree from the strictly continuous signal stream in time on the radio interface. This decoupling must also enable the performance of timing corrections of the signal stream transmission and reception which are required to conform to the strict timing pattern of the data signal streams on the radio interface. Moreover, a synchronization technique should also allow the reception of signals from neighbouring cells, which typically have a shifted timing pattern in relation to the serving cell.

In GSM systems, data are transmitted on the radio interface in bursts, which are separated by time gaps. These gaps can be used for timing adjustments by the terminal, thus the synchronization of internal processing with the reception/transmission timing does not pose particular problems. Also in W-CDMA (Wideband Code Division Multiple Access) systems, no particular requirements regarding synchronization have to be observed, as there are no dedicated channels which would have to be coordinated in time between different users, i.e. the reception/transmission timing is not very critical. For example, a timing advance correction is not required.

SUMMARY

There is a demand for a technique for controlling a synchronization of a terminal device with a wireless network over a radio interface, wherein data are block-wise processed internally while conveyed in a strictly continuous fashion on the radio interface.

This demand is satisfied by a method for controlling a synchronization of a terminal device with a wireless network over a radio interface, wherein the method comprises the steps of receiving a data signal comprising a representation of at least one data block over the radio interface; writing data samples obtained from the received signal to a reception data buffer; establishing a time-address mapping indicative of an association of a reference time value of an internal clock of the terminal device with a reference address in the reception data buffer; determining an address of one or more data samples representing the received at least one data block in the reception data buffer based on the time-address mapping; and initiating a block-wise reading of the at least one data block from the reception data buffer based on the determined address.

The received data signal may, for example, comprise OFDM, SC-FDMA or similar symbols which represent jointly processed (e.g., jointly encoded and/or transformed) blocks of data transmitted over the radio interface. The data samples written to the buffer may represent the encoded data blocks. In order to decode the data blocks and recover the data, knowledge of a location of the data samples representing a data block in the reception data buffer is required, e.g. a start address of the first of the data samples representing the data block in the buffer. This is achieved by the above method.

In one implementation, the data signal is continuously received over the radio interface, for example in an LTE environment. The continuous reception rate may be used in conjunction with the time-address mapping for determining addresses of data samples in the reception data buffer. In one mode of this implementation, the data samples are written with a constant sample rate corresponding to the continuous reception of the data signal on the radio interface to the reception buffer.

The internal clock may comprise a clock system including a primary and a secondary clock, wherein for example the primary clock provides a fundamental, background or reference timing while the secondary clock provides a timing synchronized to the serving cell or a neighbouring cell. Both the primary and the secondary clock may be running independently of each other (apart from synchronization events acting to re-set the secondary clock). In an alternative implementation, the secondary clock may be defined by an offset to the primary clock, i.e. a clock value of the secondary clock is derived as needed from the primary clock. In other implementations, the primary clock may be derived from the secondary clock. In such an implementation one clock only may explicitly be implemented and may be re-set to be synchronized to a current cell while a reference timing may be derived therefrom and a corresponding offset. The clock system may comprise multiple secondary clocks with one secondary clock for each of multiple cells around the terminal device.

The time-address mapping generally defines a mapping of an internal time of the terminal as measured by the internal clock to an address indicating a storage position in the buffer to which the received data are written. A time-address mapping may relate a particular time point as measured by a secondary clock in synchronization with a serving/neighbouring cell to a particular address in the buffer. As a concrete example, the mapping may associate a time point related to a received frame pattern with a buffer address of a data block received in that frame.

As another example, the reference time value of the internal clock may be a time value provided by the internal clock at an arbitrarily selected point in time. For example, the time point may be randomly selected or the current value of the internal clock when performing the step of establishing the time-address mapping may be selected. The reference address may be an address, for example the start address, related to a data sample written to the reception data buffer at the time corresponding to the reference time value of the internal clock.

The step of establishing the time-address mapping may comprise successively establishing multiple time-address mappings, for example establishing first the above outlined arbitrary mapping, which is then used to establish further mappings of particular time points (referring to the time of the cell synchronized with) with corresponding addresses in the buffer. In this way, an internal timing of the terminal (which may be used for a block- or burst-wise reading and processing of the data blocks from the buffer) may, for example, be associated with a continuous reception of the data signal over the radio interface, i.e. a synchronization with a time scheme (frame pattern) provided over the radio interface.

The step of writing the data samples may comprise collecting data samples in a First-In-First-Out ("FIFO") buffer and writing the collected data samples burst-wise to the reception data buffer. The data samples may be provided in a continuous or streaming fashion to the FIFO buffer.

In one realization of the method, the step of establishing the time-address mapping comprises determining the reference address written to at the time indicated by the reference time value. In another realization, the step of establishing the time-address mapping comprises setting the reference address to be written to at the time indicated by the reference time value. The latter representation may be used, e.g., in conjunction with a digital interface such as a DigRF interface.

The step of determining the address of the one or more data samples representing the received at least one data block may comprise the steps of detecting a predefined synchronization pattern in the data samples written to the reception data buffer and determining a reference time value of the internal clock based on an address of the detected synchronization pattern. The synchronization pattern may be provided by the network in the data signal. The time-address mapping may be used to determine the reference time value. One implementation of the method may then comprise the further step of establishing a time-address mapping indicative of an association of the reference time value of the internal clock with the address of the synchronization pattern. The time-address mapping may map an internal time of the terminal to an address related to the synchronization pattern as represented by the data samples stored in the buffer.

One mode of the method comprises the further step of determining from a first and a second time-address mapping a timing offset between internal timing and cell timing, wherein the address of the data block is determined based on the timing offset. The cell may be the serving cell or a neighbouring cell. More than one timing offset may be determined in the terminal device. Correspondingly at least one of a timing offset between internal timing and serving cell timing and one or more timing offsets between internal timing and one or more neighbouring cell timings may be determined and used to synchronize the terminal device not only with the serving cell, but also with a neighbouring cell.

One variant of the method comprises the further step of determining the address of the data block based on the time-address mapping. For example, one mode of the method may comprise the further step of establishing a time-address mapping indicative of an association of a reference time value of the internal clock with an address of a data block in the reception data buffer. For instance, the mapping may directly indicate a start address of a data block stored in the buffer as transmitted in a data frame over the radio interface. In this way, a first mapping and the detected synchronization pattern may be used to define a further mapping for indicating a frame timing in the downlink.

Any of the time-address mappings enables that for each specific time point, e.g. a frame start, a corresponding address in the buffer can be identified, e.g. the start address of the data sample written at the specific time point to the buffer. In this way, a data block can be identified and read out for further processing. For example, a time-address mapping may be used to adjust a secondary clock to run synchronously with the serving cell. A frame start (beginning of a data block) in the buffer may be determined using the adjusted secondary clock.

According to one realization of the method, the step of initiating the reading from the reception data buffer is performed asynchronously to the step of writing to the reception data buffer, i.e. there is no tight coupling between the writing of the data samples to the buffer and the block-wise reading of the data from the buffer for further processing. In other words, depending on the type and size of the buffer, the processes of writing to and reading from the buffer may be decoupled from each other. For example, in a circular buffer the reading of a data block (symbol) from the buffer may be started at any time after the last data sample for the block has been written to the buffer and before the first data sample belonging to the block is overwritten with new data samples.

The steps of writing the received data samples to the reception data buffer and initiating the block-wise reading of the data blocks therefrom may be performed after a step of performing an analog-to-digital conversion of the received signal and before a step of demodulating and possibly decoding of a data block read from the reception data buffer. In this way, the internal processing of the received data may be decoupled from the reception of the data as early as possible.

The method may comprise setting a read pointer indicative of an address of the data block to be read from the reception data buffer forward or backward in time, for example in order to read data received from a neighbouring cell with a different timing. Accordingly, the read pointer may be set forward or backward according to a serving cell timing or a neighbouring cell timing.

The above-mentioned demand is further satisfied by a method for controlling an uplink synchronization of a terminal device with a wireless network. The method comprises the steps of receiving a timing advance value from the wireless network; determining a start time for a transmission based on the timing advance value; selecting a start address in a transmission data buffer; initiating a block-wise writing of at least one data block to the transmission data buffer based on the selected start address; initiating a reading of data samples from the transmission data buffer based on the selected start address at the determined start time; and initiating an uplink transmission of a data signal comprising a representation of the read data samples over a radio interface to the network.

The method may comprise the step of establishing a time-address mapping indicative of an association of a reference time value of an internal clock of the terminal device with a reference address in the transmission data buffer, wherein the steps of initiating the reading and the uplink transmission are performed based on the time-address mapping.

The start address may be arbitrarily selected in the transmission data buffer. Similarly to the reception process, an internal timing of the terminal (which may be used for a block- or burst-wise processing and writing of data blocks (symbols) to the transmission data buffer) may be associated with the continuous transmission of the data signal over the radio interface, i.e. a synchronization with a time scheme (frame pattern) provided over the radio interface.

The data signal may be continuously transmitted over the radio interface, i.e. in a streaming fashion, for example with a constant data rate.

According to a variant of the method, a new start address is selected between a write point and a read point in the transmission data buffer in response to a change in the timing advance value. The distance between the point of reading from the buffer and the point of (over-)writing the buffer may be interpreted as a time window, for example when referring to a constant data transmission rate over the radio interface. As the data within this window has already been read out, new data may be stored arbitrarily therewithin and a reading therefrom may be initiated such that the transmission over the radio interface may continue seamlessly. One implementation of the method may comprise that at least one of a write pointer indicative of an address of a data block to be written to the transmission data buffer and a read pointer indicative of an address of a data block to be read from the transmission data buffer is set forward or backward in time in the transmission data buffer.

Also in case of a continuous transmission over the radio interface, the reading of the data samples from the transmission data buffer may comprise reading a collection of data samples burst-wise from the transmission data buffer into a First-In-First-Out ("FIFO") buffer. From the FIFO buffer the data may then be provided in a continuous fashion for the radio transmission.

The step of initiating the writing to the transmission data buffer may be performed asynchronously to the step of initiating a reading from the transmission data buffer, i.e. there is no tight coupling between the writing of the data samples to the buffer and the block-wise reading of the data from the buffer for transmission. In other words, depending on the type and size of the buffer, the processes of writing to and reading from the buffer may be decoupled from each other.

The steps of writing the data blocks to the transmission data buffer and reading the data samples therefrom may be performed after a step of modulating a data block to be written to the transmission data buffer and before a step of performing a digital-to-analog conversion of the signal to be transmitted. In this way, the internal processing of the data to be transmitted may be decoupled from the transmission of the data as long as possible. In particular, the writing to and reading from the transmission data buffer may be performed after a coding and modulation of the data to be transmitted.

The abovementioned demand is further satisfied by a computer program product, which comprises program code portions for performing the steps of one or more of the methods and method aspects described herein when the computer program product is executed on one or more computing devices, for example a terminal device. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a (wireless) data network such as a mobile network, the Internet or a communication line such as a telephone line or wireless link.

Further, the abovementioned demand is satisfied by a terminal device adapted for controlling a synchronization with a wireless network over a radio interface, which comprises a component adapted to receive a data signal comprising a representation of at least one data block over the radio interface; a component adapted to write data samples obtained from the received signal to a reception data buffer; a component adapted to establish a time-address mapping indicative of an association of a reference time value of an internal clock of the terminal device with a reference address in the reception data buffer; a component adapted to determine an address of one or more data samples representing the received at least one data block in the reception data buffer based on the time-address mapping; and a component adapted to initiate a block-wise reading of the at least one data block from the reception data buffer based on the determined address.

The terminal device may further comprise a component adapted to detect a predefined synchronization pattern in the data samples written to the reception data buffer. Additionally or alternatively, the terminal device may comprise a component adapted to establish a time-address mapping indicative of an association of a reference time value of the internal clock with an address of the synchronization pattern.

The reception data buffer may be implemented as a circular buffer. In other implementations, a toggle buffer or a linear buffer may be employed. One implementation of the terminal device further comprises a FIFO buffer adapted to continuously collect data samples and to write the collected data samples burst-wise to the reception data buffer.

The abovementioned demand is moreover satisfied by a terminal device adapted for controlling an uplink synchronization of a terminal device with a wireless network. The terminal device comprises a component adapted to receive a timing advance value from the wireless network; a component adapted to determine a start time for a transmission based on the timing advance value; a component adapted to select a start address in a transmission data buffer; a component adapted to initiate a blockwise writing of at least one data block to the transmission data buffer based on the selected start address; a component adapted to initate a reading of data samples from the transmission data buffer based on the selected start address at the determined start time; and a component adapted to initiate an uplink transmission of a data signal comprising a representation of the read data samples over a radio interface to the network.

The transmission data buffer may be a circular buffer. In other implementations, a toggle buffer or a linear buffer may be employed. The terminal device may further comprise a FIFO buffer adapted to read a collection of data samples burst-wise from the transmission data buffer and to continuously forward the data samples.

The abovementioned demand is further satisfied by a terminal device adapted for controlling a synchronization—including downlink and uplink synchronization—with a wireless network, which comprises a combination of the terminal device adapted for controlling an uplink synchronization with the terminal device adapted for controlling a downlink synchronization as summarized above. Eventually the abovementioned demand is satisfied by a terminal device adapted for controlling a synchronization with a wireless network, comprising a radio receiver adapted to receive a downlink data signal; an analog-to-digital converter adapted to convert the received data signal; a reception data buffer adapted to buffer data samples obtained from the received data signal; a clock system adapted to provide timing references; a timing event generator adapted to provide a trigger signal to a control unit associated with the reception data buffer; a cell finder adapted to detect a predefined synchronization pattern in the data samples written to the reception data buffer; a demodulator adapted to demodulate data blocks read from the reception data buffer; a modulator adapted to modulate data to be transmitted to the network; a transmission data buffer adapted to buffer data samples received from the modulator; a digital-to-analog converter adapted to convert data read from the transmission data buffer; a radio transmitter adapted to transmit the data signal in the uplink, and a processor adapted to control a synchronization of the terminal device with the network by establishing a time-address mapping indicative of an association of a reference time value of the clock system with a reference address in at least one of the reception data buffer and the transmission data buffer.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as a particularly configured terminal device, in order to provide a thorough understanding of the current invention. It will be apparent to one skilled in the art that the current invention may be practiced in other embodiments that depart from the specific aspects described below. For example, a terminal device is described which comprises circular buffers, a DSP (Digital Signal Processor), a single internal clock, etc. Other embodiments may be implemented using other or additional components. For example, different buffer concepts may be used, a microcontroller instead of a DSP, two clocks instead of a single clock, etc. Further, while techniques are described below as being implemented in terminal devices for communication with wireless networks, at least some of these techniques may also be implemented on the network side, for example in a radio base station. This may be relevant, e.g., for the techniques related to buffer access (read/write) described below with regard to FIGS. 6 and 10.

Moreover, below it is referred to data transmissions in an LTE environment. The techniques described herein may however be used in various wireless network environments, for example for transmissions based on OFDM, W-CDMA, SC-FDMA networks, or in wireless (or even fixed) environments such as in DVB-T, DVB-H (Digital Video Broadcast-Terrestrial, -Handheld), DAB (Digital Audio Broadcast), WLAN (Wireless Local Area Network), ADSL (Asynchronous Digital Subscriber Line), WiMAX (Worldwide Interoperability for Microwave Access) or Bluetooth networks. The techniques may also be used in environments in which data are transmitted burst-wise over the (radio) interface, for example in GSM networks.

Those skilled in the art will further appreciate that functions explained hereinbelow may for example be implemented in the form of a hardware circuitry, a combination of software and hardware, but also on a pure software (firmware) basis, for example for purposes of testing a functionality of a processor which will later be implemented as a software on the processor.

Figure 1:
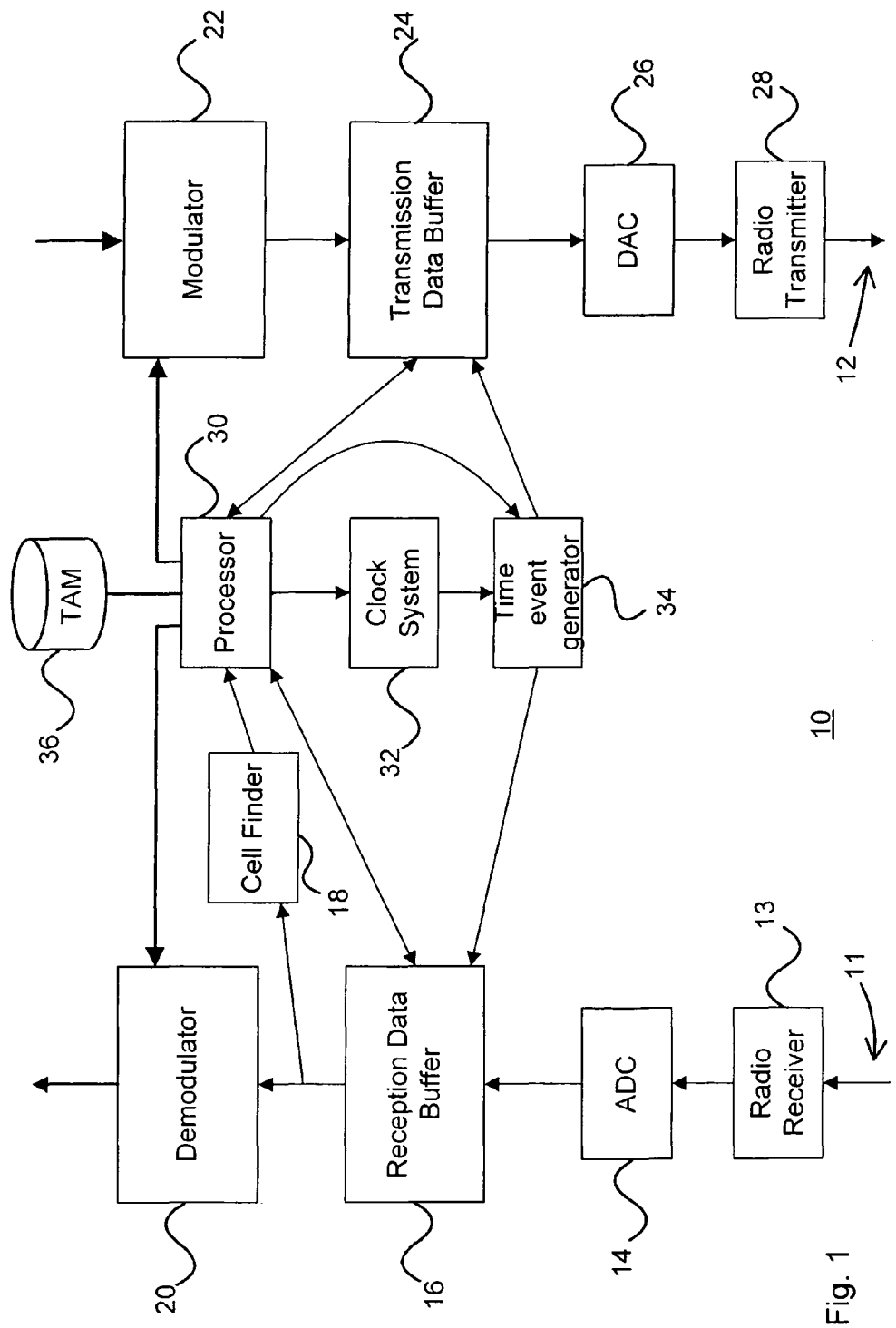
FIG. 1 schematically illustrates a first embodiment of a terminal device.

FIG. 1 schematically illustrates functional components of an embodiment of a terminal device 10 which is adapted for communication with a wireless network via downlink 11 and uplink 12. The terminal device 10 comprises in a receiving stage a radio receiver 13, an Analogue-to-Digital-Converter (ADC) 14, a reception data buffer 16 including control units to control a writing of data to the reception data buffer and a reading of data from the reception data buffer, a cell finder 18, and a demodulator 20. A transmission stage of the device comprises a modulator 22, a transmission data buffer 24 including control units to control a writing to and reading from the transmission data buffer, a Digital-to-Analogue-Converter (DAC) 26 and a radio transmitter 28. The terminal device 10 further comprises a processor 30 for controlling a synchronization with the network in both reception and transmission, a clock system 32 and a timing event generator 34.

Generally, a data signal is received via downlink 11 by the radio receiver 13. The ADC 14 converts the received analogue data signal into a digital signal. The digital data samples obtained from the received signal are stored in the reception data buffer 16. The demodulator 20 accesses the stored data, demodulates the data and provides the demodulated data to further internal processing components of the terminal device 10. For synchronization with the downlink 11, the cell finder 18 operates to detect a predefined synchronization pattern in the data samples stored in the reception data buffer 16.

For the transmission case, the modulator 22 receives data from other internal components of the terminal device 10 and modulates the data for a transmission in the uplink 12 to the network. The modulated data are written to the transmission data buffer 24. The DAC 26 receives the data samples from the buffer 24 and converts them into an analogue signal, which is eventually transmitted in the uplink by the radio transmitter 28.

The clock system 32 operates to provide timing reference(s) for the device 10. The reception data in the reception data buffer 16 are structured according to a frame pattern provided over the downlink 11. The processor 30 controls synchronization amongst others by providing to the demodulator 20 correct addresses taking account of the frame pattern for reading blocks of reception data from the reception data buffer 16. While a downlink synchronization may be achieved in a simple way in case data are received in a burst-like fashion in dedicated time slots assigned to the device 10, in case the data are received in a continuous stream over the downlink 11 the frame pattern imprinted on the data stream as represented in the buffer 16 cannot be identified based on time slots. In order to achieve such a synchronization, it is proposed herein to establish one or more Time-Address-Mappings (TAMs) 36 between time points provided by the clock system 32 and addresses in the reception data buffer 16. The TAMs 36 are used by processor 30 for calculating correct addresses in one or both of the buffers 16 and 24, as will be described in detail below.

In order to establish a TAM, the processor 30 may control the timing event generator 34 to provide, at a particular time as measured by the clock system 32, a trigger signal to the buffer 16. In response to the trigger signal, the buffer 16 (more precisely, a control unit associated therewith) provides an indication of an address to the processor 30. The address may be, for example, the start address of a data sample currently written to the data buffer 16. The processor 30 establishes a TAM by associating the time of trigger with the delivered address and stores the TAM in the buffer 36. The stored TAM or TAMs may be used to achieve a synchronization in the downlink, and in the uplink.

Figure 2:
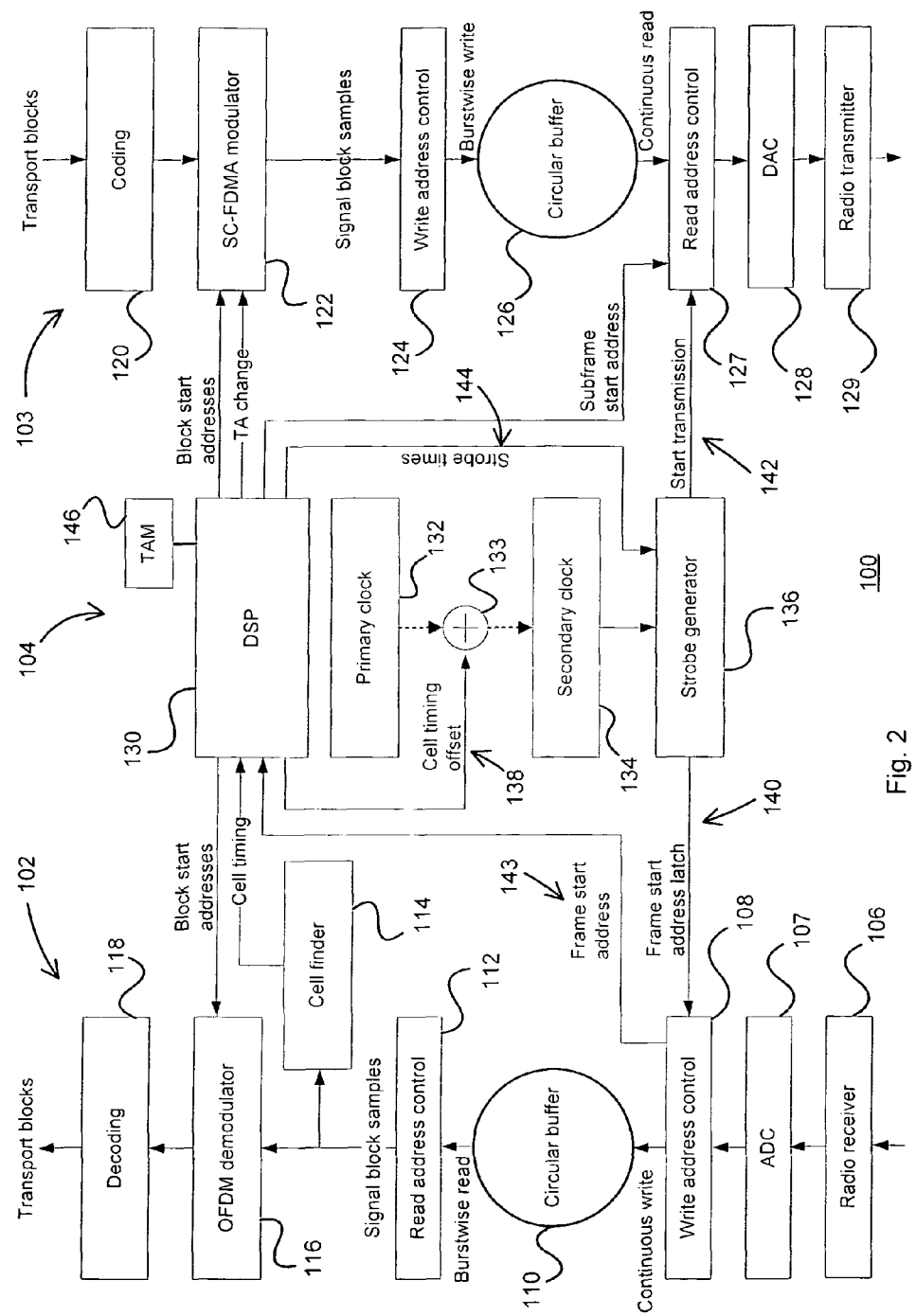
FIG. 2 schematically illustrates a second embodiment of a terminal device.

FIG. 2 schematically illustrates functional components of a second embodiment of a terminal device 100 which is adapted for communication with a concrete realization of a wireless network, namely an LTE (Long Term Evolution) network not shown in FIG. 1 for the sake of clarity. The terminal device 100 may form part of a mobile terminal for LTE and is configured as a transceiver with a receiving stage 102, a transmission stage 103, and central control components 104 for controlling both stages 102 and 103. The receiving stage 102 comprises a radio receiver 106, an Analog-to-Digital-Converter (ADC) 107, a write address control 108, a reception data buffer 110, a read address control 112, a cell finder 114, an OFDM demodulator 116, and a decoder 118. The terminal device 100 may comprise two or more receiving stages for communication with, e.g., different cells of the LTE network. The further receiving stages may function the same or differently as stage 102. However, in the following it is only referred to the receiving stage 102 for the sake of illustration.

The transmission stage 103 comprises an encoder 120, an SC-FDMA modulator 122, a write address control 124, a transmission data buffer 126, a read address control 127, a Digital-to-Analog Converter 128, and a radio transmitter 129. The central control components 104 comprise a DSP (Digital Signal Processor) 130, a primary clock 132, an adder 133, a secondary clock 134, and a strobe generator 136.

The DSP 130 operates as a control processor (the terms 'DSP' and 'control processor' will be used more or less synonymously herein) which, for example, receives measurement parameters such as cell timings from the cell finder 114 and buffer states such as particular buffer addresses from the write address control 108, and computes control parameters from these input parameters. For example, the DSP 130 may compute a cell timing offset for the secondary clock 134, trigger signals for the strobe generator 136, or addresses of data blocks in the buffers 110 and 126 for components such as the demodulator 116 or the modulator 122 which need to read data from or write data to the buffers. Further, the control processor 130 controls reading access of the demodulator 116 to the reception data buffer 110 and writing access of the modulator 122 to the transmission data buffer 126. The DSP 130 may perform further control operations related to the operation of the terminal device 100 (or a mobile terminal the device 100 is embedded in), or may be devoted to the synchronization tasks described herein.

In the example illustrated in FIG. 2, the reception data buffer 110 and the transmission data buffer 126 are both implemented as circular buffers. Basically, the buffers 110 and 126 are employed to support a processing of data in block format (internal processing) on the one side and a conveyance in continuous or streaming format (radio interface) on the other side. Instead of circular buffers, any components or entities may be implemented which allow performing such kind of serial-to-parallel conversion on the receiving side and parallel-to-serial conversion on the transmitting side, respectively.

The internal clock of the terminal device 100 is a clock system comprising the primary clock 132 and the secondary clock 134. The primary clock 132 provides the general internal time reference for the terminal device 100. The secondary clock 134 is adjusted to run synchronously with the cell currently serving the terminal device 100 (or a neighbouring cell), as will be described in detail below. It is indicated in FIG. 1 that the secondary clock 134 may be configured by applying a timing offset 138 via the adder 133 to the time reference provided by the primary clock 132. The secondary clock need not be a hardware unit. For example, a time signal of the secondary clock may be generated at any time when needed, by applying the timing offset 138 to the output signal of the primary clock 132 (the timing offset might, e.g., be stored in the DSP 130 for that purpose). However, for the sake of clarity, reference will be made below to the secondary clock 134 as an explicit unit provided separately from the primary clock 132.

The secondary clock 134 operates to trigger the strobe generator 136 which in turn operates to trigger (trigger signal 140) the write address control 108 which in response provides an indication of the address currently written to in buffer 110 to the control processor 130. The strobe generator also triggers (trigger signal 142) the read address control 127 to start reading from the buffer 126 with a sample rate as required for the transmission, as will also be described in more detail further below. Any kind of trigger mechanism might be implemented as the strobe generator, as long as it is able to create the appropriate trigger signals 140 and 142, respectively, in response to a control signal from the DSP 130 or a timing signal from the secondary clock 134.

Figure 3:
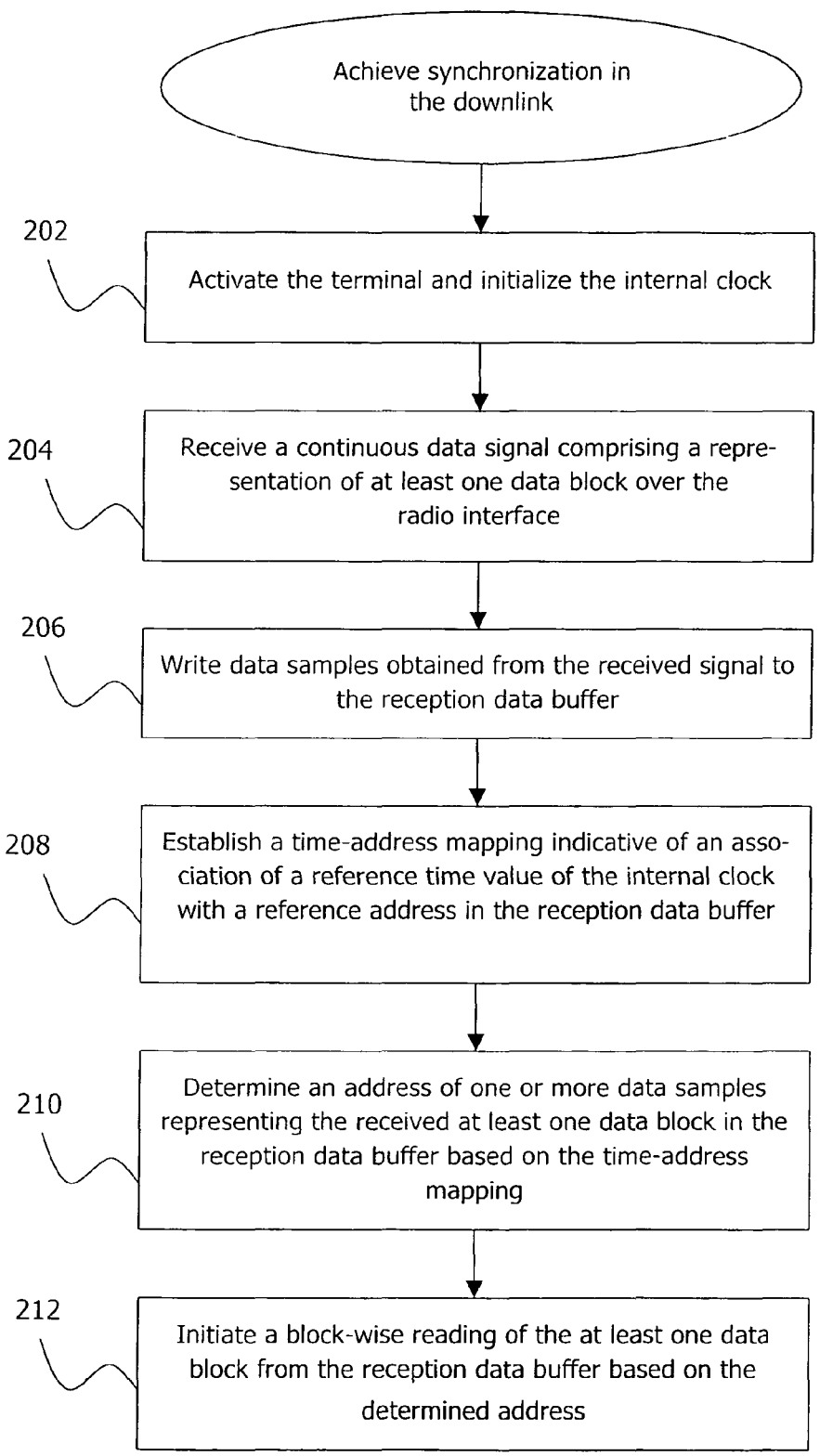
FIG. 3 is a flow diagram illustrating an operation of the terminal device of FIG. 2 for a reception of a data signal in the downlink.
Figure 4:
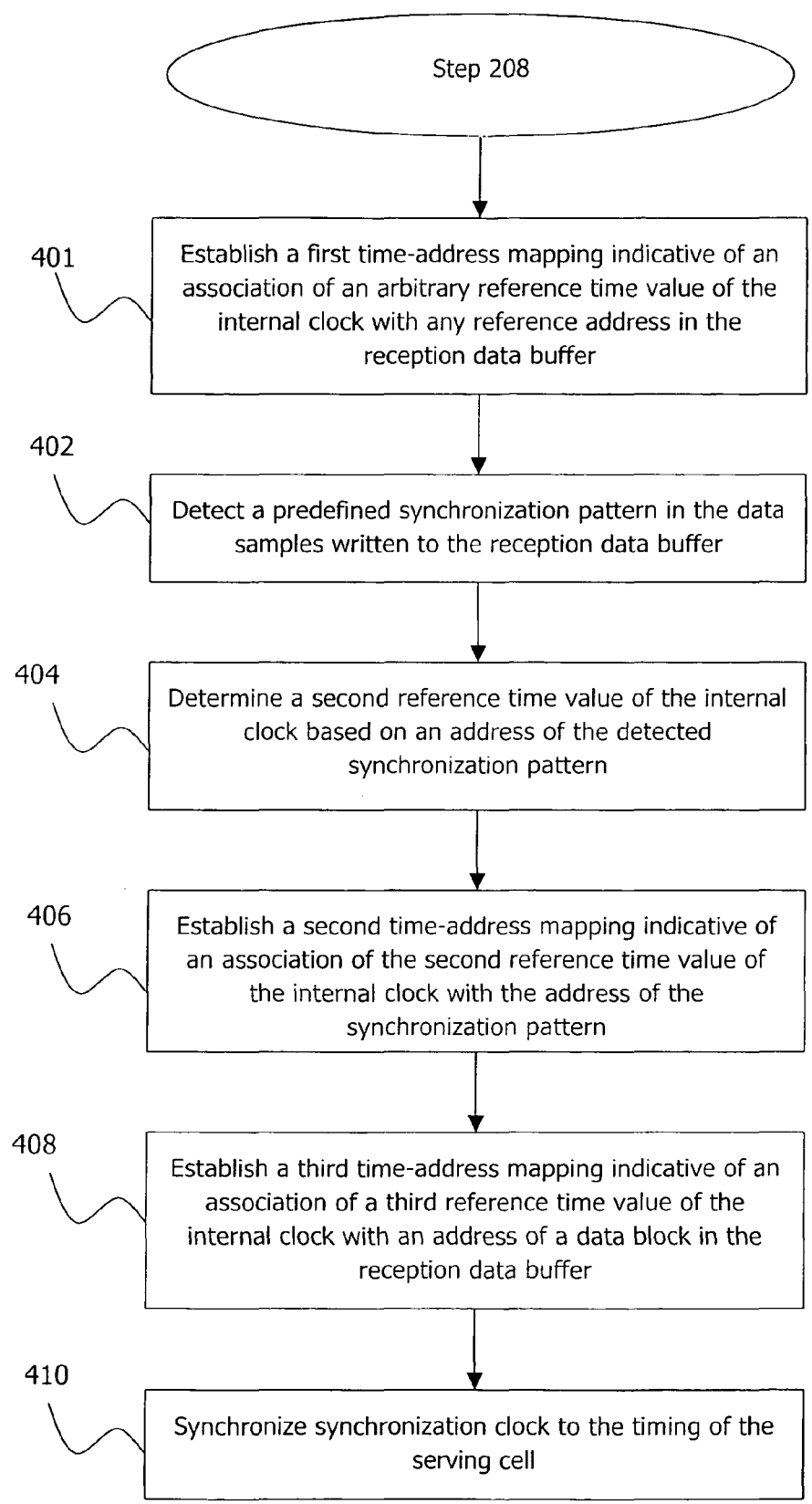
FIG. 4 schematically illustrates a time-address mapping established by the terminal device of FIG. 2.

An operation of the terminal device 100 and an interworking of the various components thereof will now be described with reference to FIGS. 3-5. FIG. 3 is a flow diagram illustrating operational steps performed by the components of the receiving stage 102 and the central control components 104 for receiving and processing data from the LTE network. Generally, the components interwork with each other in order to achieve and maintain a synchronization of the terminal device 100 with the LTE network over the radio interface in the downlink. In particular, the positions of the received data blocks as written to the buffer 110 have to be determined in order to be able to correctly read out the data from the buffer 110 in block-wise fashion for the further processing.

In step 202, the terminal device 100 is activated. With regard to synchronization, the primary clock 132 is started and provides an internal timing reference which is arbitrarily positioned in time, i.e. is not synchronized or in any other way related to any timing pattern of the serving cell or surrounding cells of the LTE network. Initially, the offset 138 is zero, i.e. the secondary clock 134 runs synchronously with the primary clock 132 without offset. The radio receiver 106 listens to the downlink.

In step 204, a continuous or streaming data signal comprising a representation of at least one data block is received over the radio interface (the technique described herein may however also be applied in cases in which the received data signal is a non-continuous, e.g. a burst-wise, signal). Specifically, the radio receiver 106 receives the downlink data signal, which is converted into a digital signal by the ADC 107 and is then written in step 206 to the reception data buffer 110 by the write address control 108. In the embodiment described here, the data samples obtained from the digitized signal are written as a continuous stream to the buffer 110. In other words, the data samples are written with a constant sample rate to the circular buffer 110.

In step 208, a time-address mapping is established, which is indicative of an association of a reference time value of the one of the primary clock 132 and secondary clock 134 of the terminal device 100 with a reference address in the reception data buffer 110. A detailed example of how the step 208 may be performed is described with reference to FIG. 4. In step 401, the DSP 130 triggers the strobe generator 136 at an arbitrarily selected time point, which is a first reference time value of the primary clock 132 (the reference time value may be represented as a particular counter value of the clock 132). The strobe generator 136 is prompted to send the control signal 140 to the write address control 108 which in turn is triggered to provide an address indication 143 to the control processor 130. The address indication 143 relates to the start address of the storage position of the momentarily written data sample in the circular buffer 110. As will be described in more detail below, the write address control 108 may control writing to the buffer 110 by means of a write pointer indicating the start address of the currently written storage position. Thus, in response to the trigger 140 the write address control 108 may simply provide the current pointer position as the address indication 143 to the DSP 130.

The control processor 130 operates to associate the first reference time value from the primary clock 132 with the indication 143 of the address currently written to in the buffer 110 and in this way establishes a first time-address mapping (TAM) and stores this TAM in a buffer 146. The relevance of this mapping will be discussed with reference to FIG. 5, which shows a time T as measured by the primary clock 132 along a time axis 302, and which further shows a "time flow" based on a sequence of writing addresses in the circular buffer 110 as indicated by the write pointer (WP) along time axis 304. It is to be noted that the WP addresses proceed at a constant rate in time, namely with the above-mentioned sample rate sr which is based on the continuously received data signal on the radio interface. As both, the time T as measured by the primary clock 132 and the WP address positions proceed constantly, a mapping such as the first time-address mapping (and the further time-address mappings discussed below) allows the identification of timing patterns of the radio interface with data structures as represented in the buffers 110 (and 126) and vice versa. For example, the beginning in time of a frame can be identified with a particular address in the buffer 110 corresponding to the beginning of the data block transmitted in this frame. This will be described in more detail below.

Referring again to FIG. 5, at a time point T0 the writing of data samples to the reception data buffer 110 may begin (step 206). The first reference time value selected by the control processor 130 as described above is indicated as T1 in FIG. 5. At T1, the first time-address mapping 146 of T1 to the current write address addr1 is established. The mapping T1-addr1 will be used as described hereinafter.

In step 402, a predefined synchronization pattern is detected by the cell finder 114 in the data samples written to the reception data buffer 110. More specifically, the cell finder 114 reads the data samples stored in the buffer 110. The cell finder 114 may read the data in data bursts, i.e., block-wise, wherein the size of the data bursts can be chosen according to the processing properties of the cell finder 114 (in particular, the data bursts need not be related to the sizes of the data blocks or symbols stored in the buffer 110). Moreover, the cell finder may chose any arbitrary time point for reading the data from the buffer 110 as long as the data to be scanned are not overwritten (necessarily, it has to be ensured by a control entity that the reading process does not overtake the writing process). Therefore, the step 402 of detecting a synchronization pattern is decoupled to a degree dependent on the size of the buffer 110 from the steps 202 and 204 of receiving the data and writing them to the buffer 110.

As soon as the cell finder has successfully detected a synchronization pattern in the data samples stored in buffer 110, the cell finder 114 provides a corresponding indication to the control processor 130. Accordingly, in step 404, the control processor 130 determines a second reference time value T2 (see FIG. 5) of the primary clock 132 based on an address of the detected synchronization pattern, which may, for example, be a start address addr2 of the pattern in the buffer 110. This address may be indicated by the cell finder 114 to the DSP 130, or the DSP 130 may in response to the indication of the cell finder 114 trigger the strobe generator 136, which in turn triggers the write address control 108 to provide an address indication to the DSP 130. This address indication may be used as a basis for calculating the start address addr2 of the detected synchronization pattern.

Figure 5:
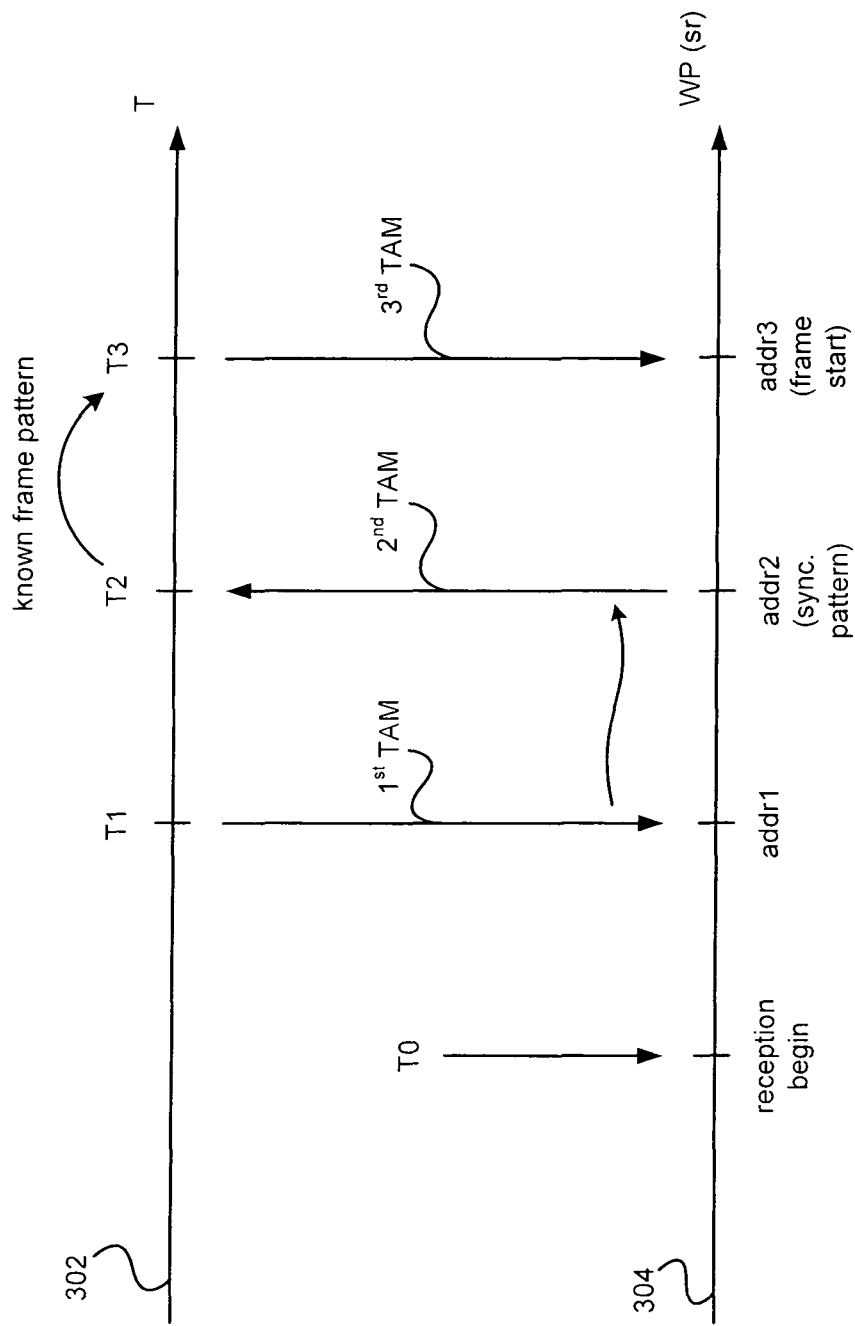
FIG. 5 is a flow diagram illustrating a further operation of the terminal device of FIG. 2 for a reception of a data signal in the downlink.

As illustrated by axis 302 and axis 304 in FIG. 5, basically each sample address in the buffer 110 corresponds to a particular time instant. Therefore the difference between the sample address addr1 of the first time-address mapping and the sample address addr2 related to the detected synchronization pattern yields a time offset between the arbitrary internal timing according to the primary clock 132 and the timing of the serving cell. In other words, the reference time point T2 may be calculated, for example, from the detected start address addr2, the first time-address mapping T1-addr1, and the constant sample rate sr. The control processor may then operate to, e.g., store the time reference T2 and the address addr2 in association with each other and may thus establish the second time-address mapping (step 406) and store this $2^{nd}$ TAM in the buffer 146 additionally to the $1^{st}$ TAM or by replacing the $1^{st}$ TAM with the $2^{nd}$ TAM.

The secondary clock 134 may be synchronized to the timing of the serving cell. This may be achieved by determining the timing offset between T2 and T1 and providing this offset 138 to the adder 133, which accordingly configures the secondary clock 134. In some embodiments, based on the second time-address mapping, the secondary clock may be used to provide timings required to determine the addresses of data blocks to be read out from the circular buffer 110.

However, in the embodiment described here, in step 408 a third time-address mapping is established, which is indicative of an association of a third reference time value of the internal clock with an address of a data block in the reception data buffer 110. This third time-address mapping may be used as the basis for actually reading out data blocks from the buffer 110. Specifically, the control processor 130 may determine, based on the time value T2, i.e. the position in time of the synchronization pattern, and a predefined timing pattern as provided by the LTE network, a time point T3 (cf. FIG. 5) corresponding to the beginning of a data frame. At time T3, the control processor 130 triggers the strobe generator 136 to send the control signal 140 to the write address control 108, which in turn indicates (indication 143) an address addr3 to the control processor 130, which is the start address of the frame currently received, i.e. the start address of the data block currently written to the buffer 110.

The DSP 130 may establish the third time-address mapping T3-addr3 and may store also this TAM in the buffer 146. In some embodiments, the timing offset 138 provided to the adder 133 may be adjusted accordingly, i.e. the time offset 138 may be based on T3 and T1, such that the secondary clock 134 may be (re-)configured in order to now be synchronized to the frame structure in the data as written to the buffer 110 (step 410). Based on address addr3, the DSP 130 may calculate further relevant addresses in the buffer 110, namely the start addresses of subsequent data blocks (e.g., symbols) in the buffer 110.

Generally, the cell timing as indicated by either the second or the third time-address mapping may be used to distinguish the data blocks in the circular buffer 110, such that, for example, a demodulation of the OFDM symbols represented by the data blocks becomes possible. The terminal device 100 may initiate a random access procedure based on the downlink timing as represented by the timing offset 138 or the secondary clock 134.

The steps 402-408 and/or step 410 may be repeatedly performed, e.g. on a regular basis. For example, the cell finder 114 may continuously operate to observe the cell timing in the downlink and the control processor 130 may continuously adjust the timing offset 138 correspondingly. The third time-address mapping may also be readjusted.

While in the embodiment described here the $1^{st}$ TAM and the $2^{nd}$ TAM are established and then used to determine the offset 138 for synchronizing the secondary clock 134 with the cell, in other embodiments the secondary clock may be directly synchronized to a cell upon detection of a synchronization pattern in the received data by a cell finder. In such embodiments, it is not mandatory to establish an arbitrary $1^{st}$ TAM. In some embodiments, the $2^{nd}$ and $3^{rd}$ TAM may be identical due to an accordingly adjusted cell finder, i.e. only two TAMs are required. It is also possible to establish one or more TAMs for multiple cells, e.g. $1^{st}$-$3^{rd}$ TAM for the serving cell, $4^{th}$-$6^{th}$ TAM for a first neighbouring cell, $7^{th}$-$9^{th}$ TAM for a second neighbouring cell, etc.

In the terminal device 100 in FIG. 2 the secondary clock 134 is not constantly coupled to the primary clock 132. Instead, the dashed arrows connecting the primary clock 132 to the adder element 133 and the adder element 133 to the secondary clock 134 are meant to indicate that, once the secondary clock 134 is set into a state of synchronization with the serving cell or a neighbouring cell by a signal from the primary clock 132 and the adder 133, the secondary clock 134 runs independently of the primary clock 132. This is advantageous for tracing and receiving data from neighbouring cells.

Referring back to FIG. 3, in step 210 an address of one or more data samples representing the received at least one data block in the reception buffer is determined based on the third time-address mapping T3-addr3 and, in the embodiment described here, the sample rate sr (possible implementations of this step will be discussed below). The determined address may be a start address of the data block (which may, e.g., be an OFDM symbol) as stored in the buffer 110. In step 212, a block-wise reading of the at least one data block from the reception data buffer 110 will be performed based on the determined address. In the embodiment described here, the DSP 130 may signal the block start address to the OFDM demodulator 116 which accordingly reads out the data block via the read address control 112. The further processing of the read out data block, which may represent an OFDM symbol, may comprise the application of an FFT (Fast Fourier Transform) in the demodulator 116 in order to recover multiple OFDM sub-carriers and may further comprise in the decoding component 118 the channel decoding of the data and eventually the provision of the decoded data to other components.

Figure 6:
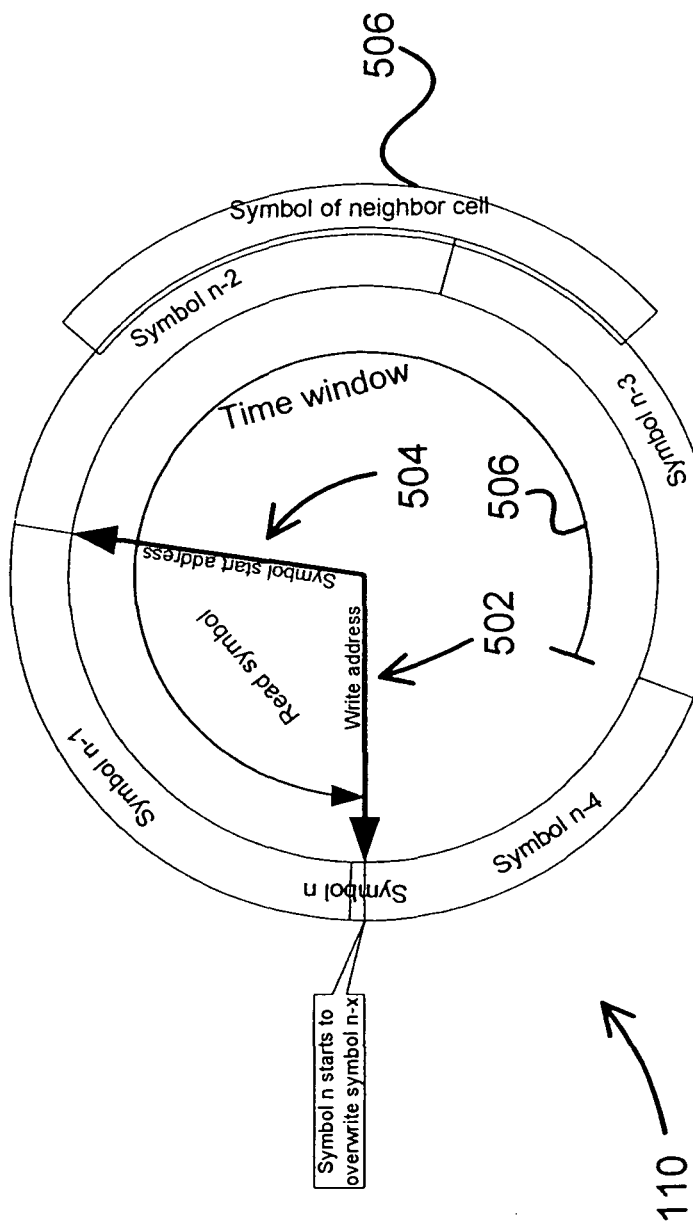
FIG. 6 schematically illustrates a usage of the reception buffer of the terminal device of FIG. 2.

FIG. 6 schematically illustrates the write and read processes performed on the circular buffer 110. A write pointer 502 points to the start address of a symbol (data block) n which is currently written to the buffer 110. A read pointer 504 points to the start address of symbol n-1 which may next be read from the circular buffer. In the exemplary configuration illustrated in FIG. 5, the symbols n-3, n-2 and n-1 may be read, while symbol n-4 cannot be read any longer, as it is already overwritten by symbol n.

The reading may be performed in a burst-wise fashion, i.e. the data samples representing the symbol may be read essentially in parallel from the buffer 110. Further, while the writing to the buffer is performed relatively slow at the constant sample rate sr, the reading may be performed much faster than the writing. Based on one of the above-discussed time-address mappings according to which any address in the CB 110 corresponds to a particular time instant of the cell timing as measured by the secondary clock 134, it can be said that in principle the reading can be started at any time within a reading time window 506 defined by the next useful address position directly in front of the write pointer 502 (e.g., the start address of a data block which is next going to be overwritten) and the last useful address position directly behind the write pointer 502 (e.g., the last address of the most recently written data block). The only requirement for the read pointer 504 is to stay inside the time window 506; in particular, the read pointer should not overtake the write pointer 502 and should also not be overtaken by the write pointer 502. A circular buffer address control has to be implemented in the device 100 in order to ensure that such overtaking is prevented. Apart from these requirements, the read pointer 504 may be freely positioned within the time window 506. For example, the read pointer may be positioned at the start address of any of the data blocks n-3, n-2, n-1. The start address of data block n-4 has already been overwritten; thus the remaining data of the data block n-4 are not useful anymore and the time window 506 is illustrated as starting only with the start address of data block n-3 in FIG. 6.

Thus, as defined by the time window 506 the reading and subsequent processing of the data in buffer 110 can be performed asynchronously, i.e. de-coupled or "offline", from the writing process. As therefore the timing requirements for the internal processing are considerably more relaxed as are the timing requirements on the radio interface, no particularly accurate timing control for the internal processing is required, such that a conventional processor may be used for the internal timing. More specifically, as the timing tolerances are proportional to the buffer size (see the time window 506 in FIG. 5), a control processor with given timing accuracy may be chosen corresponding to the buffer size. For example, in case a small buffer is a design choice, more accurate triggers from the strobe generator or a similar component are required to trigger the reading at well defined time instances. Thus, the techniques proposed herein allow the configuration of the terminal device to be adapted to specific design requirements.

The write pointer 502 moves with the constant sample rate sr, which allows in principle the determination of the start addresses of the sequence of data blocks written to the buffer 110 once and for all (based, e.g., on one of the second or third time-address mappings, as described above). However, there are various circumstances in which the address positions (e.g. the starting addresses) of the data blocks may shift in the buffer. For example, the write pointer 502 may temporarily be stopped because there are no data received over the radio interface. As another example, the cell timing may change due to the mobility of the terminal device 100 in the serving cell, which also leads to a shift in the data block positions in the buffer. When re-establishing, for example, the second or third time-address mapping as described above in order to take account of such shifts in the buffer 110, the read pointer 504 may freely be re-set to the correct address positions, i.e. may be re-set to any address within the time window 506 backward or forward in time.

FIG. 6 further illustrates that also symbols of neighbouring cells may be stored in the circular buffer 110. This can be achieved for example by adjusting the cell timing offset 138 such that the secondary clock 134 is synchronized with the timing, e.g. the frame pattern, of the neighbouring cell. With regard to the configuration shown in FIG. 6, for example the symbols n-3 and n-2 of the serving cell may have been read already. Then, the corresponding frame start address of a data block 508 received from a neighbouring cell has to be determined as described above based on, e.g., a second or third time-address mapping related to the frame pattern of the neighbouring cell. As the read pointer 504 may be freely set within the time window 506, the data block 508 of the neighbouring cell may be read at any time as long as the data block 508 is not overwritten. In this way, for example a signalling of neighbouring cells can be received and processed in parallel to the data received from the serving cell.

Figure 7:
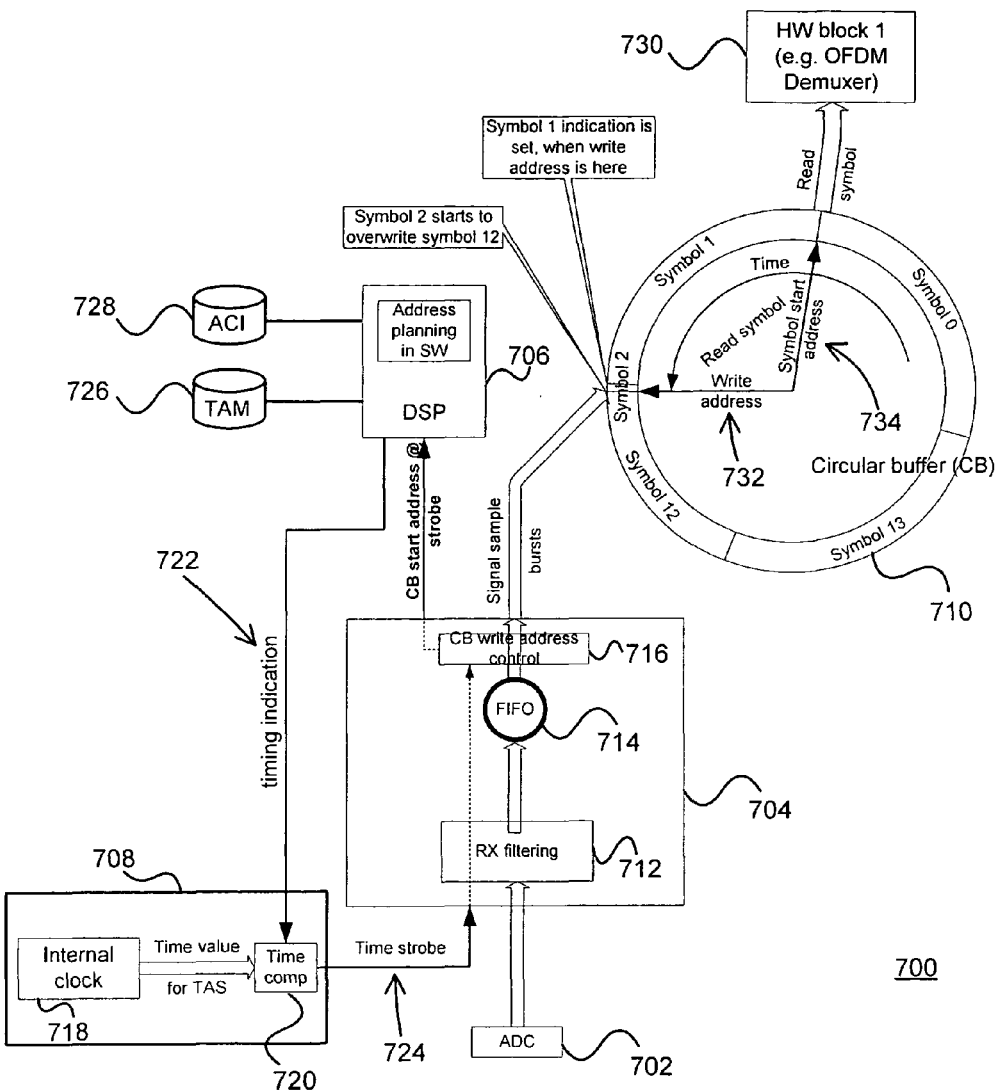
FIG. 7 schematically illustrates a third embodiment of a terminal device.

FIG. 7 shows a third embodiment of a terminal device 700 wherein in particular a reception stage is illustrated. The following description concentrates on how received data may be written to a reception data buffer and how a time-address mapping may be achieved by the components of the terminal device 700 and the interworking thereof. Those aspects of the device 700 which are similar to the embodiments will not be described again, i.e. any function or property of the device 700 not explicitly mentioned may assumed to be as described for the other embodiments discussed herein.

The device 700 comprises an ADC 702, a data conditioning unit (DCU) 704, a digital signal processor 706, a clock system 708 and a Circular Buffer (CB) 710. The DCU 704 comprises a digital filter 712, a First-In-First-Out (FIFO) buffer 714 and a write address control 716. The clock system 708 comprises an internal clock 718 and a time comparator 720. The internal clock 718 may comprise a primary and secondary clock as described for the embodiment of FIGS. 2-5.

There is no explicit functional unit representing a synchronisation clock (such as the clock 134 in FIG. 2) implemented in terminal device 700. Instead, a current cell timing offset is stored in the DSP 706 and is provided as a timing indication 722 to the comparator 720 in case a synchronisation with a serving or neighbouring cell is to be achieved. The timing indication 722 may also include a correction for a latency time associated with an access to the CB 710. The comparator 720 operates to compare the time indication 722 with the time value provided by the clock 718 and provides a trigger signal or "time accurate strobe" (TAS) 724 to the DCU 704 in case the time indication 722 coincides with the time value of clock 718.

The TAS 724 passes by the filter 712 and arrives at the write address control 716, which in response to the TAS 724 delivers to the DSP 706 the start address of the data currently written to the CB 710. The DSP 706 establishes a time-address mapping (TAM) from the timing indication 722 and the received CB start address at this time, which is then stored in a buffer or cache 726 associated with the DSP 706.

The DSP 706 uses the one or more time-address mappings in buffer 726 together with a predefined Address Calculation Instruction (ACI) stored in a further buffer 728 in order to calculate further addresses in the buffer 710, for example, CB reading addresses for internal components such as a de-multiplexer 730 exemplary illustrated in FIG. 7. The ACI may represent the scheme according to which a given frame pattern on the radio interface is represented as a data structure in the buffer 710. As an example, the storage capacity of the circular buffer 710 may be an input parameter to the ACI. As a further example, an input to the ACI 728 may be the constant sample rate (such as the sample rate sr referred to in the above examples) which represents the continuous reception of streaming data over the radio interface.

It is to be understood that a time-address-mapping together with knowledge of the radio frame pattern and a constant sample rate allows the determination of any start address of a frame (data block, e.g. an OFDM symbol) in the buffer 710 based, e.g., on an address of a known synchronization pattern.

To further illustrate this point, in the exemplary terminal device 700 the DCU 704 comprises the FIFO 714, which collects digitized data from the radio and then writes the collected data samples in a burst-wise fashion to the circular buffer 710. The writing may be performed burst-wise, because the buffer 710 may be optimized for burst-wise accesses with regard to access delay times, i.e. any writing (or reading) access shall include writing (or reading) a minimum amount of data. Therefore, although the data signal may be continuously received, the data may be written burstwise to the CB 710. Nevertheless, it is clear that the address calculation (using the ACI) in the DSP 706 may still be based on the assumption of a continuous writing process to the buffer 710 as long as the writing bursts from the FIFO 714 are small enough, for example are much smaller than the storage capacity of the buffer 710 or smaller than a typical reading burst, i.e., a data block or symbol to be read from the buffer 710. In this case, a write pointer 732 may be assumed to move continuously with a constant sample rate sr, similar to what has been described with regard to FIG. 6, although in fact the write pointer 732 moves in a discrete fashion, wherein the discrete steps may depend for example on the chosen storage capacity of the FIFO 714. In case the sample rate sr is a sufficiently accurate approximation of the movement of the write pointer 732, the ACI may entirely ignore the burst-wise writing of received data samples to buffer 710.

Figure 8:
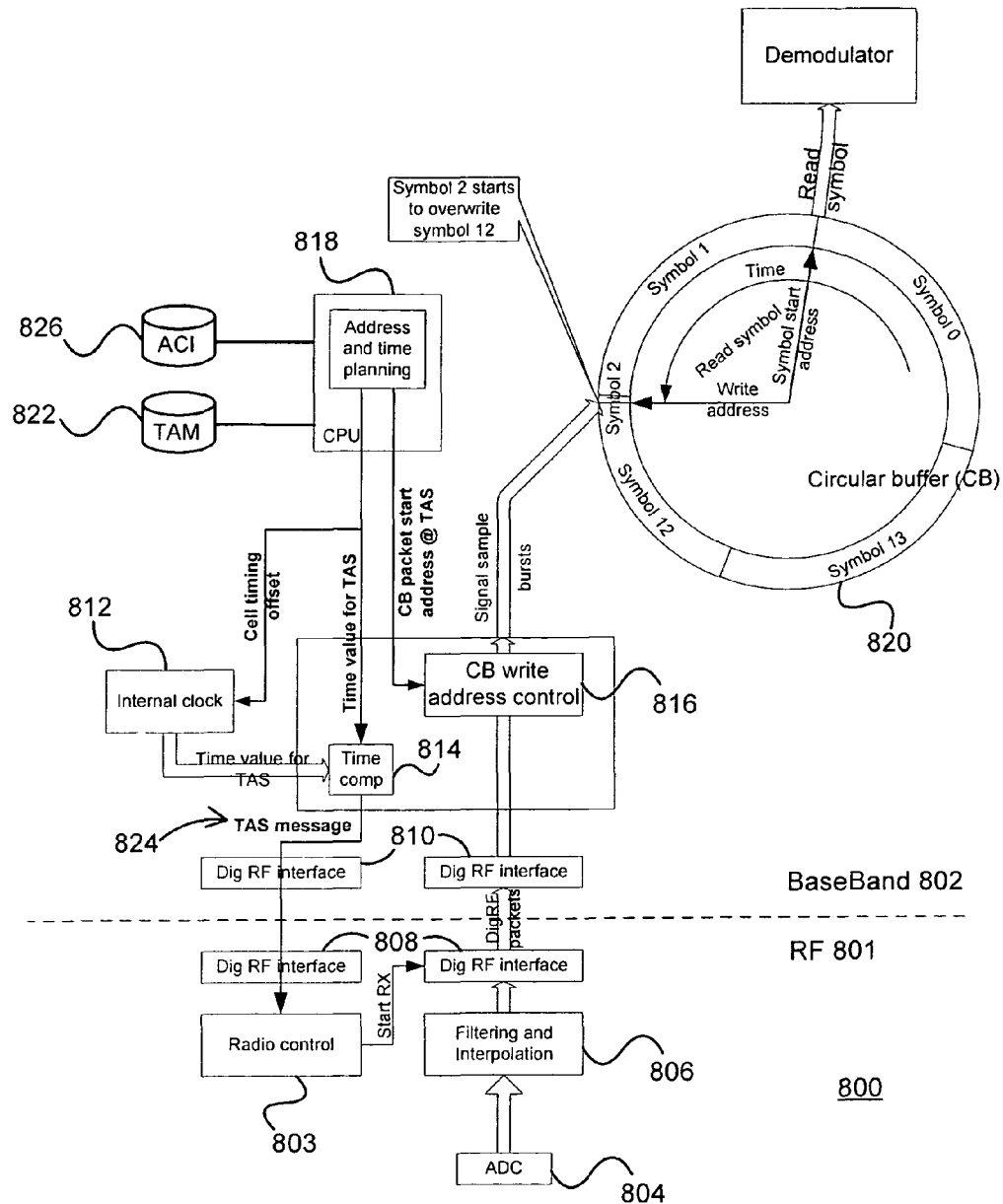
FIG. 8 schematically illustrates a fourth embodiment of a terminal device.

FIG. 8 is a schematic illustration of a fourth embodiment of a terminal device 800. While the terminal device 800 has some similarities to the device 700 described above, the device 800 comprises a digital interface separating a radio part (RF) 801 from an internal or baseband processing part 802. The digital interface is implemented based on the DigRF interface standard conventionally known. Each of the parts 801 and 802 may be implemented, for example, on a separate ASIC. The RF part 801 of the terminal device 800 comprises a radio control 803, an ADC 804, a filtering and interpolation component 806 as well as DigRF interfaces 808. The baseband 802 components comprise DigRF interfaces 810 for communication with the RF part 801, an internal clock 812, a time comparator 814, a write address control 816, a processor 818 implemented as a CPU in this example and a circular buffer (CB) 820.

In the terminal device 800, the CPU 818 establishes a time-address mapping (TAM) without the need to measure or otherwise determine a packet start address in the buffer 820.

Instead, the CPU 818 defines an association of a start address in the buffer 820 with an arbitrary point in time and stores this as a TAM in a buffer 822 The selected time value (possibly including a correction for a latency time associated with an access to the CB 820) is provided to the time comparator 814. When the time as provided by the internal clock 812 coincides with the time value provided from the CPU 818, the time comparator provides a digitized "time accurate strobe", namely a TAS message 824 via the DigRF interfaces 810 and 808 to the radio control 802.

According to the TAS message 820, the radio control 802 instructs the DigRF interface 808 to start transmitting DigRF packets representing digitzed and filtered reception data to the opposite DigRF interface 810. The write address control 816 writes data samples as received in the DigRF packets burst-wise to the buffer 820. To this end, the write address control 816 receives the packet start address from the TAM as selected by the processor 818 and then starts writing packets thereto.

The writing of data to the CB 820 may be performed burst-wise, because the buffer 820 is optimized for a burst-wise accesses, similar to what has been discussed for the buffer 710 in FIG. 7. Assuming that the data is received in a streaming fashion over the radio interface, the DigRF interface may include some buffer capacity (not shown in FIG. 8), for example a FIFO buffer similar to the FIFO 714, which can be employed to buffer continuously received data until a data burst via the write address control 816 is performed.

Similar to what has been described above for the terminal device 700, address calculation instructions (ACI) which may be available to the processor 818 in an associated buffer 826 may ignore that the data samples are written in bursts to the buffer 820 and may instead be based on the assumption that the received data are written with a constant sample rate as given by the continuous reception over the radio interface. This assumption may hold as long as the write bursts are small compared to the size of the data blocks (symbols) to be read from the buffer 820.

While the use of circular buffers is illustrated in many of the embodiments described here, in general any type of buffer may be employed for implementing any of the techniques proposed herein, such as toggle buffers and linear buffers. As an example, in GSM networks bursts are received at a dedicated time slot assigned to the terminal by the network. Thus the terminal knows when the burst is to be expected, such that the data obtained from a received burst can always be written to the same buffer within the same fixed address space, e.g. starting at a fixed address '0000'. The only requirement is that the buffer has to be read out before the next burst is received and stored at exactly the same space. Thus, for the internal processing the data may be read from the buffer always in exactly the same way. While also in such an environment a time-address mapping can be defined as described herein, the address will always be the same, e.g. '0000' and the time is related to the position of the time slot as assigned by the network.

For communication with multi-channel networks such as in a GPRS environment, multiple buffers may be provided for each of the multiple bursts received on the different channels, which may then be managed as described above for a single buffer in a GSM environment. In case the data are received in a continuous, streaming fashion over the radio interface, such as in LTE networks, circular buffers may be used. For example, in case such a stream lasts of order 100 milliseconds, the amount of data is larger than what normally may be stored in a linear buffer. Thus, the data are written to the circular buffer and have to be read out until they are overwritten by the next data from the stream. The positions of the frames (data blocks) in the circular buffer are a priori not known, as there is no dedicated time slot or time point, at which the reception starts. The proposed techniques allow the identification of the frame structure as represented in the circular buffer.

Figure 9:
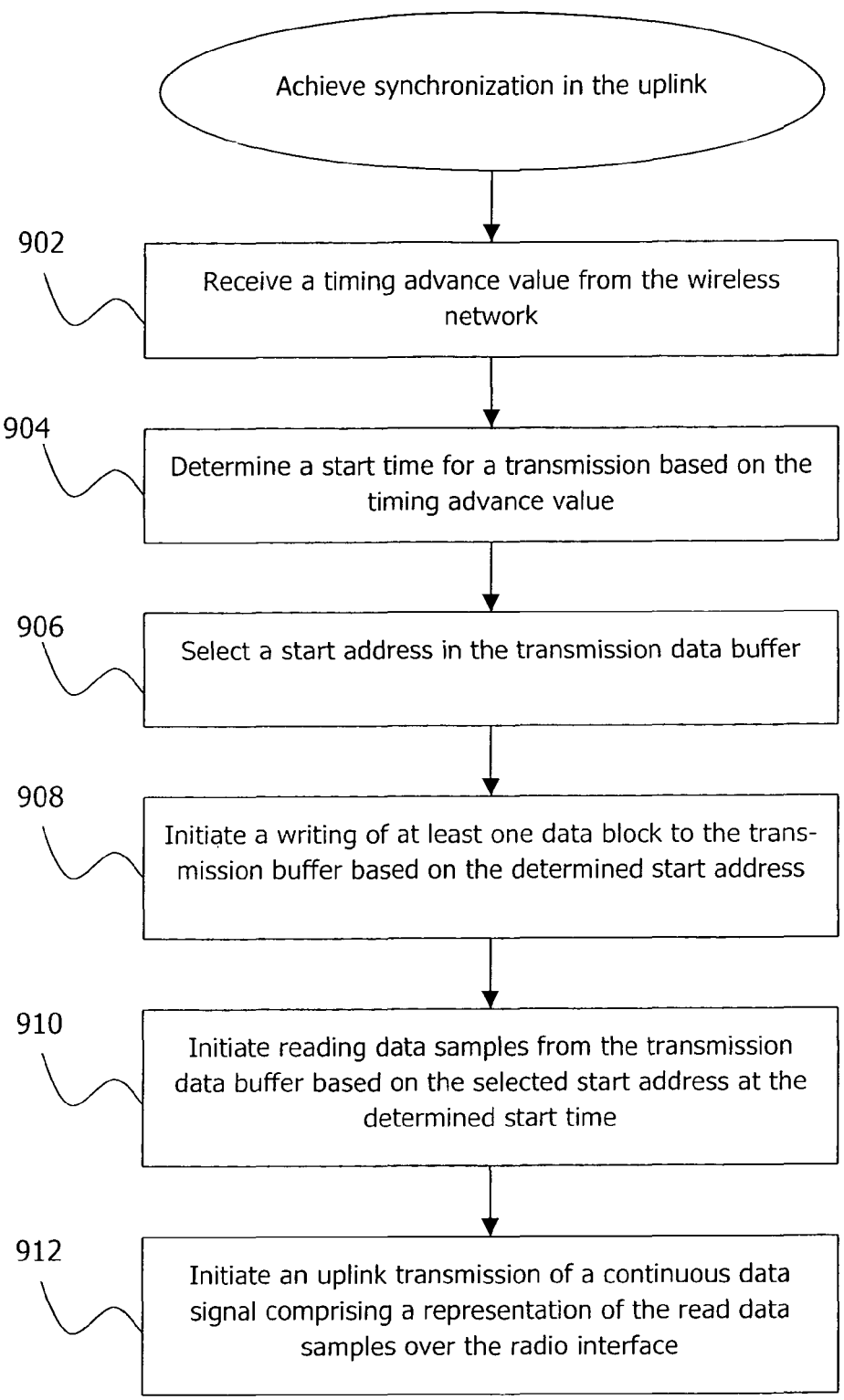
FIG. 9 is a flow diagram illustrating an operation of the terminal device of FIG. 2 for a transmission of a data signal in the uplink.

With reference to FIG. 9, an operation and inter-working of components of the terminal device 100 of FIG. 2 for achieving a synchronization in uplink direction is described. In principle, the terminal device 100 may synchronize to the LTE network and start with a data transmission over the radio interface as soon as a timing advance value has been received from the LTE network (step 902).

In step 904, a start time for the transmission is determined based on the received timing advance value. Specifically, the DSP 130 may calculate the timing of a strobe signal 144 indicating the start time for the transmission based on the reference time value T3 (cf. FIG. 5), for example, which marks the begin of a frame in the downlink. The start time for the transmission has to be adjusted based on the timing advance value to the timing in the uplink. In other words, the strobe 144 occurs earlier by the timing advance value than a corresponding (sub-)frame strobe for the downlink. Instead of the time value T3, also the time value T2 or T1 may be used to calculate the start time for the transmission.

In step 906, the control processor 130 selects an (arbitrary) start address in the transmission data buffer 126 and indicates it to the SC-FDMA modulator 122, thus initiating a block-wise writing of at least one data block to the transmission data buffer 126 based on the selected start address (step 908). Specifically, the modulator 122 uses the indicated start address as the block start address to write the first SC-FDMA symbol to the buffer 126 via the write address control 124. The start address is also used by the control processor 130 to calculate the start addresses of subsequent data blocks to be written to the transmission data buffer 126 and to indicate these to the modulator 122. As the symbols are stored in consecutive order in the buffer 126, in this way an image of a portion of a continuous signal stream to be sent over the radio interface is formed in the buffer 126.

In step 910, data samples are read with a constant sample rate from the transmission data buffer 126 based on both the determined start address and the determined start time. In detail, the control processor provides the (sub-frame) start address to the read address control 127 (this operation may already be performed in step 906). Further, the control processor 130 provides a control signal to the strobe generator 136, which is thereby triggered to send the strobe signal 144 to the read address control 127.

In step 910, data samples are read with a constant sample rate from the transmission data buffer based on the selected start address at the determined start time. Specifically, the read address control 127 comprises a start function which is triggered by the strobe signal 144 and initiates the reading of data samples with a constant sample rate from the transmission data buffer 126 based on the subframe start address provided by the control processor 130. The start function also initiates an uplink transmission of a continuous data signal comprising a representation of the read data samples over the radio interface (step 912), which is achieved by forwarding the read data samples to the DAC component 128 and the radio transmitter 129.

Figure 10:
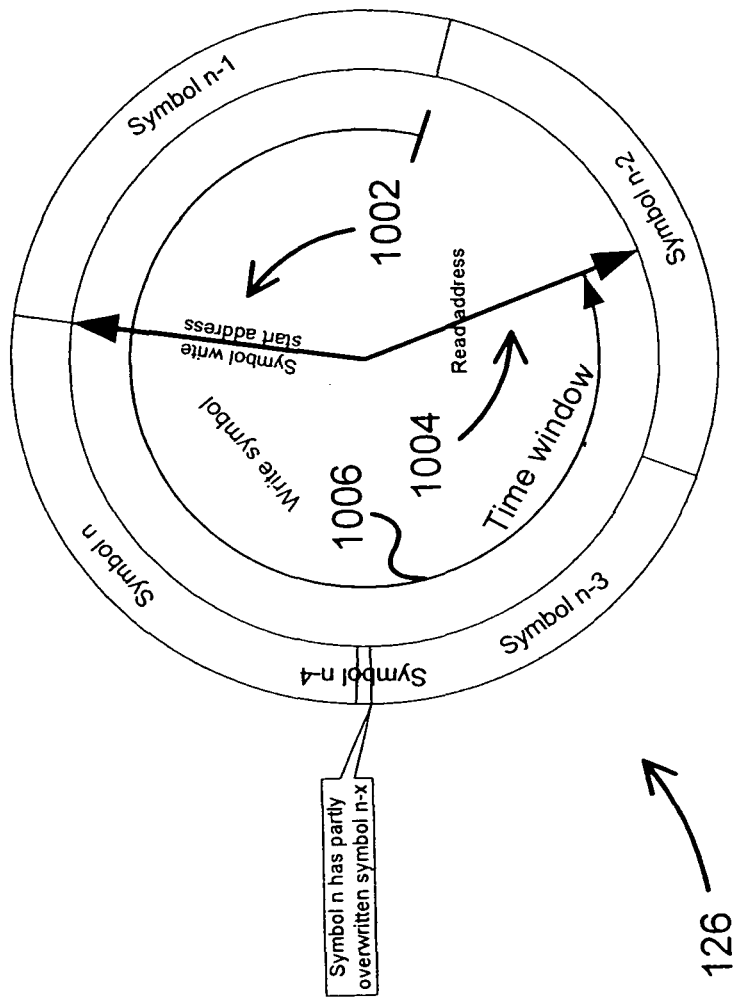
FIG. 10 schematically illustrates a usage of the transmission data buffer of the terminal device of FIG. 1.

FIG. 10 schematically illustrates the write and read processes performed on the circular buffer 126. A write pointer 1002 points to the start address of an SC-FDMA symbol (data block) n which is currently written to the buffer 126. A read pointer 1004 points to symbol n-2 which may currently be read from the buffer 126.

The writing may be performed in a burst-wise fashion, i.e. the data samples representing a symbol may be written essentially in parallel to the buffer 126. In other words, the writing in step 908 may be performed much faster than the reading in step 910, which is performed relatively slow at a constant sample rate required for the uplink transmission over the radio interface.

In principle the writing can be performed at any time within a writing time window 1006 defined by the next useful (in terms of data blocks) address position directly in front of the read pointer 1004 (i.e. the start address of the data block which is next going to be read) and the address position directly behind the read pointer 1004 (i.e. the address of a data sample or data block just been read). The requirement for the write pointer 1002 is to stay inside the time window 1006; in particular, the write pointer should not overtake the read pointer 1004 (and should also not be overtaken by the read pointer 1004). A circular buffer address control has to be implemented in the device 100 in order to ensure that such overtaking is prevented.

Therefore, as defined by the time window 1006, the step 908 of initiating a writing to the buffer 126 can be performed asynchronously, i.e. de-coupled or offline, to the steps 910 and 912 of reading and transmitting the data samples. As therefore the timing requirements for the internal processing are considerably more relaxed as are the timing requirements for the transmission on the radio interface, no particularly accurate timing control for the internal processing is required, such that a conventional processor may be used for the internal timing. More specifically, as the timing tolerances are proportional to the buffer size (see the time window 1006 in FIG. 10), a control processor with given timing accuracy may be chosen corresponding to the buffer size. For example, in case a small buffer is a design choice, more accurate triggers from the strobe generator or a similar component are required to trigger the writing at well defined time instances. Thus, the techniques proposed herein allow the configuration of the terminal device to be adapted to specific design requirements.

In principle the start addresses of the sequence of data blocks written to the buffer 126 can be computed once and for all from the initial address selected in step 906, also in case the timing advance value should change. For example, a change in the timing advance may be accounted for by the modulator 122 by adapting a length of a cyclic prefix or another redundant portion of the data accordingly. Additionally or alternatively, a new start address may be determined at any time, wherein the new address may be selected at an arbitrary position within the time window 1006. The write pointer 1002 and the read pointer 1004 both would have to be re-set. In particular, the read pointer 1004 may be re-set and may start reading from the new position triggered by a corresponding start strobe without disturbing the continuous transmission of sample streams over the radio interface with its strict timing requirements. A similar process may be performed when no data have to be transmitted for some time and the read pointer 1004 has been stopped temporarily stopped.

As the writing and reading processes are de-coupled from each other within the limits imposed by the time window 1006, the step 908 on the one hand and the steps 910 and 912 on the other hand may be performed in any order. For example, a writing of data to be transmitted to the transmission data buffer 126 may also be performed before a timing advance value is received in step 902. Also the preparatory steps 902 and 904 on the one side and 906 and 908 on the other side may be performed in any order.

Figure 11:
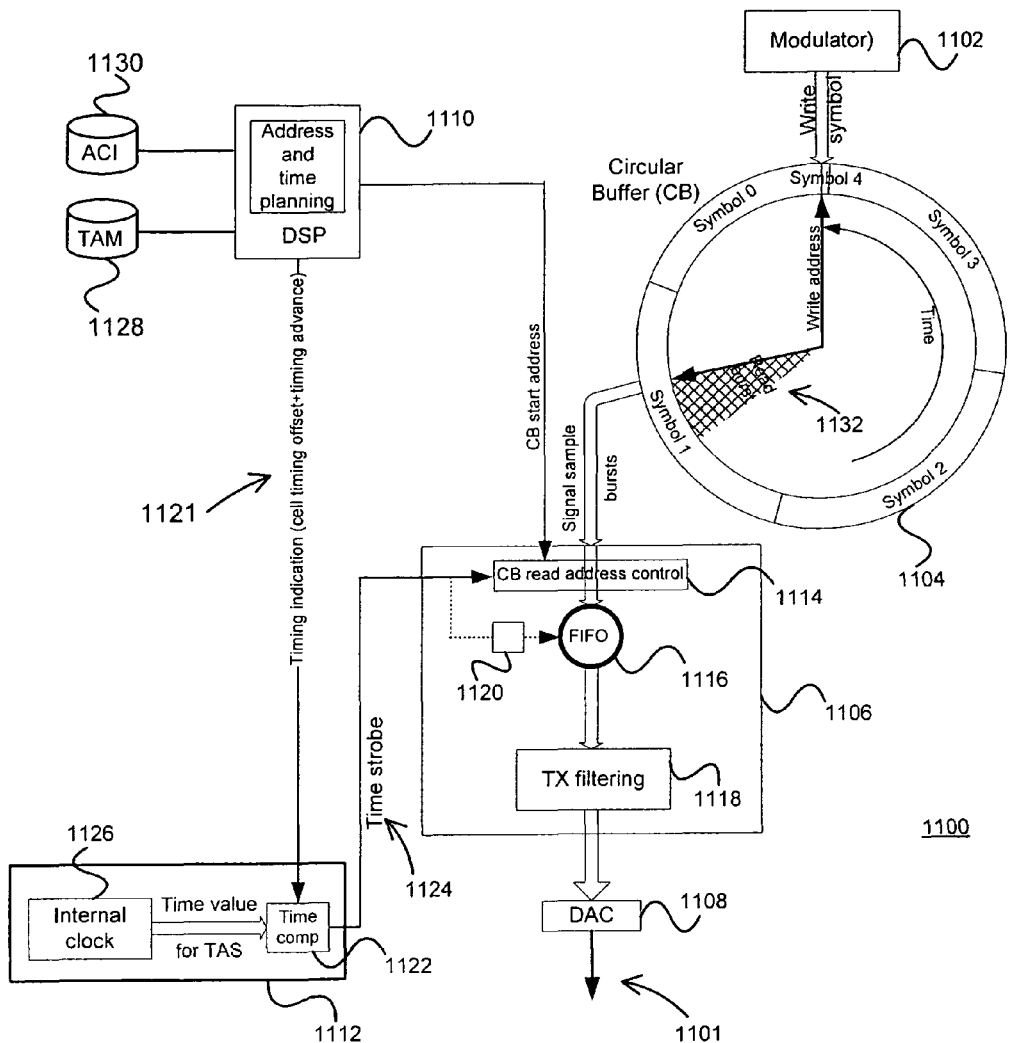
FIG. 11 schematically illustrates a fifth embodiment of a terminal device.

FIG. 11 shows a fifth embodiment of a terminal device 1100 wherein in particular a transmission stage is illustrated. The following description concentrates on how data to be transmitted may be written to a transmission data buffer and read therefrom for the transmission. The terminal device 1100 may have various operational aspects in common with the terminal devices 100 and 200 illustrated in FIGS. 1 and 2, respectively. Those aspects will therefore be omitted in the subsequent description.

Generally, the transmission stage of terminal device 1100 is adapted for uplink synchronization with a wireless network over a radio interface 1101. As an internal component of device 1100 for generating transmission data, a modulator 1102 is exemplary illustrated in FIG. 11. The transmission stage of device 1100 comprises a transmission data buffer 1104 embodied as a circular buffer, a Data Conditioning Unit (DCU) 1106 and a Digital-to-Analog Converter (DAC) 1108. The transmission stage is controlled by a processor 1110 implemented as a DSP, which further controls a clock system 1112. The DCU 1106 comprises a read address control 1114, a FIFO buffer 1116, a transmission filter 1118 and a delay circuit 1120.

In preparation of a transmission, the DSP 1110 determines a timing indication 1121 for a transmission start time. The timing indication 1121 may be based on a cell timing offset determined from downlink measurements, for example in a way as has been described with reference to any one of the embodiments of FIG. 1, 2, 7 or 8, or in any other way. The cell timing offset needs to be adjusted by a timing advance value received from the network. The DSP 1110 provides the timing indication 1121 to a time comparator 1122 of the clock system 1112. Once the internal time as provided by an internal clock 1126 equals the time indication 1121, the comparator 1122 provides as a trigger signal a Time Accurate Strobe (TAS) 1124 to the read address control 1114.

The processor 1110 further selects a start address in the circular buffer 1104 and provides this address to the modulator 1102 and the read address control 1114. The timing indication 1121 in relation to the CB start address constitute a time-address-mapping (TAM) similar to the TAMs which are established in the receiving stage. While it is implementation-dependent whether a TAM is explicitly stored as such for the transmitting stage also, for the sake if illustration a TAM storage 1128 is depicted in the example embodiment in FIG. 11, in which the TAM is stored in association with the control processor 1110. Further, the processor 1110 has access to Address Calculation Instructions (ACIs) in a storage 1130 for calculating, e.g. based on the TAM or the start address represented therein, further addresses in the CB 1104.

It is assumed that, while the modulator 1102 acts to write data blocks (symbols) block-wise to the circular buffer 1104, the corresponding data signal is continuously transmitted via the radio interface 1101. Nevertheless, in response to the reception of the TAS 1124, the write address control 1114 acts to read data samples from the transmission data buffer 1104 in a burst-wise fashion, wherein the FIFO buffer 1116 is provided for buffering and thereby adjusting the read-out data bursts to the continuous transmission over the radio interface. Similar to what has been indicated for the embodiment in FIG. 7 also, one reason for reading in a burst-wise fashion from the buffer 1104 can be that the CB 1104 is optimized for a burst-wise (reading and writing) accesses. The circular buffer 1104 may be a logical structure based upon a common memory of the terminal device 1100, i.e., a memory which is accessed by various other components of the device 1100 also. In order to minimize latency times, any access to the buffer should involve the reading or writing of a minimum amount of data. Nevertheless, a typical reading burst (indicated exemplary by area 1132 in FIG. 11) will be typically much smaller then the writing bursts from the modulator 1102, i.e., the amount of data samples read into the FIFO 1116 will be considerably less than a data block or symbol as stored in the buffer 1104. Therefore, compared to the symbol-wise processing of data internal to the terminal 1100, e.g. by the modulator 1102, the reading from the buffer 1104 can be interpreted as a continuous reading with a sample rate as required by the transmission over the radio interface 1101.

The current latency for reading data samples from the circular buffer 1104 cannot be calculated in precise value beforehand as it depends on the accesses of other components of the terminal 1100. Therefore the delay component 1120 provides some fine-tuning, i.e. operates to delay the provision of data from the FIFO 1116 towards the radio interface 1101 as required to achieve the transmission rate over the radio.

Figure 12:
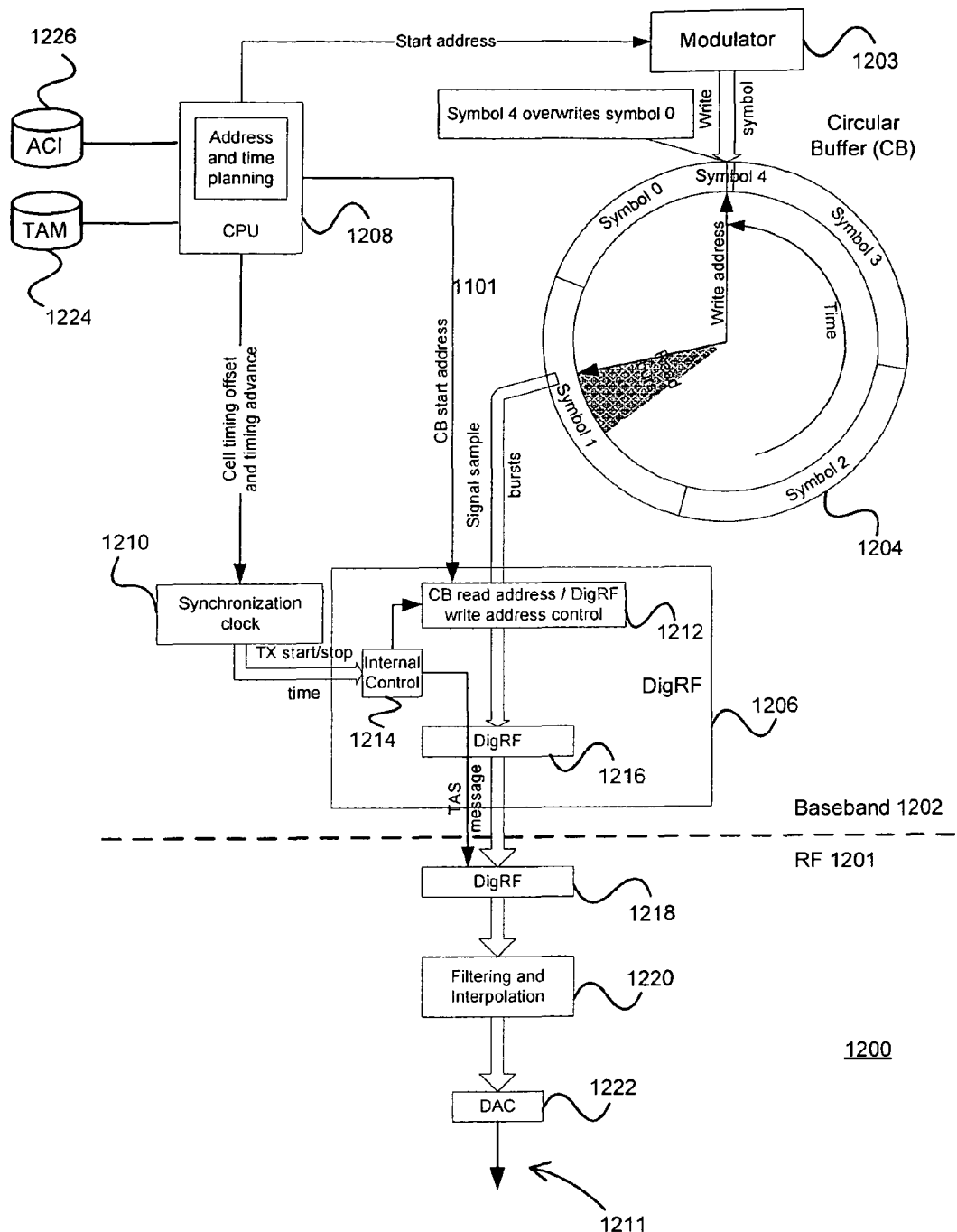
FIG. 12 schematically illustrates a sixth embodiment of a terminal device.

FIG. 12 is a schematic illustration of a sixth embodiment of a terminal device 1200. While the terminal device 1200 has some similarities to the device 1100 described above, the device 1200 comprises a digital interface separating a radio part (RF) 1201 from a baseband processing part 1202. Each of the parts 1201 and 1202 may be implemented, for example, on a separate ASIC.

The baseband 1202 components comprise a modulator 1203, a transmission data buffer 1204 embodied as a Circular Buffer (CB), a DCU 1206 implemented as a DigRF module, which are controlled by a processor 1208 implemented as a CPU in this example and a secondary clock 1210. The DCU 1206 comprises a CB read address control 1212, an internal control 1214 and a digital interface 1216 for communication with the RF part 1201. The RF part 1201 comprises a digital interface 1218, a filter component 1220 and a DAC 1222. The digital interface between baseband part 1202 and RF part 1201 is implemented based on the DigRF interface standard similarly as has been described for the receiving stage of the embodiment of terminal 800 in FIG. 8.

As has been described for the embodiment in FIG. 11, the processor 1208 may establish a time-address mapping (TAM) including a start time for a transmission based on a determined cell timing offset to the internal timing of the terminal 1200 and a timing advance value on the one hand and a selected start address in the CB 1204 on the other hand, and may store this TAM in a buffer 1224. Additionally the processor 1208 may access Address Calculation Instructions (ACIs) in a storage 1226 for calculating, e.g. based on the TAM or the start address represented therein, further addresses in the CB 1204.

The processor 1208 configures the secondary clock 1210 according to a cell timing offset and a timing advance value such that the clock 1210 is synchronized with the serving cell to which data are to be transmitted via the radio interface 1211. The secondary clock 1210 then provides trigger signals indicating transmission (Tx) start/stop times to the internal control 1214 of the DCU 1206. Further, the CPU 1208 provides the selected start address in the CB 1204 to the modulator 1203 and the read address control/DigRF write address control 1212.

The modulator 1203 writes data bursts comprising a symbol each to the CB 1204 beginning at the correspondingly indicated start addresses. The control unit 1214 triggers reading data bursts from the CB 1204 provides the data for transmission to the RF part 1201 via the digital interfaces 1216 and 1218. The reading bursts performed by the read address control 1212 include a minimum amount of data per burst in order to optimize access to the circular buffer 1204, similarly to what has been described for the embodiment of FIG. 11. In order to adapt the transmission of the data to the transmission rate required over the radio interface 1211, the digital interfaces 1216 and/or 1218 may comprise a buffer or buffers (not shown).

The techniques proposed herein enable a synchronization of a terminal device with a wireless network over a radio interface wherein a block-wise internal processing of the data is decoupled from a strictly continuous streaming over the radio interface. The degree of de-coupling depends on the sizes of the reception and transmission data buffers, respectively. Within these limits, relaxed (as compared to the requirements on the radio interface) time windows for reading from the reception buffer and writing to the transmission data buffer, respectively, are available for the internal processing.

As the timing requirements are less strict for accessing the buffer, conventional processors may be used for the internal timing control.

Moreover, the proposed techniques also allow that timing corrections for the data reception and transmission are efficiently applied. Thus, the synchronization in downlink and uplink is insensitive to jumps in the timing. Regarding data reception, the described concept of the reception buffer allows the simple re-adjustment of the reading position to timing changes due to a mobility of the terminal device in the downlink. Regarding data transmission, timing advance corrections may also be applied by re-setting write and read position in the transmission data buffer.

The proposed techniques allow a block-oriented internal processing at a very early stage, i.e. directly after an Analog-to-Digital Conversion in the receiving stage and directly before a Digital-to-Analog Conversion in the transmitting stage. Therefore, the techniques may be used in conjunction with any kind of digital interfaces, e.g. packet-based interfaces. For example, the techniques may be used to incorporate the DigRF ("Digital Radio Frequency" interface standard) interface which presumably will be used in future mobile platforms between radio interfaces and internal baseband processing.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for controlling downlink synchronization of a terminal device with a wireless network, the method comprising:

receiving from the wireless network over a radio interface a data signal comprising a representation of at least one data block;

writing data samples obtained from the received data signal to a reception data buffer;

establishing a time-address mapping indicative of an association of a reference time value of an internal clock of the terminal device with a reference address in the reception data buffer;

determining an address of one or more data samples representing the received at least one data block in the reception data buffer based on the time-address mapping, said determining comprising detecting a predefined synchronization pattern in the data samples written to the reception data buffer and determining a reference time value of the internal clock based on an address of the detected synchronization pattern;

establishing a time-address mapping indicative of an association of the reference time value of the internal clock with the address of the detected synchronization pattern; and initiating a block-wise reading of the at least one data block from the reception data buffer based on the determined address.

2. The method according to claim 1, wherein establishing the time-address mapping comprises successively establishing multiple time-address mappings.

3. The method according to claim 1, wherein the reference address is an address related to a data sample written to the reception data buffer at the time corresponding to the reference time value of the internal clock.

4. The method according to claim 1, wherein the reference time value of the internal clock is a time value provided by the internal clock at an arbitrarily selected point in time.

5. The method according to claim 1, wherein the data signal is continuously received over the radio interface.

6. The method according to claim 1, wherein writing the data samples comprises collecting data samples in a First-In-First-Out ("FIFO") buffer and writing the collected data samples burst-wise to the reception data buffer.

7. The method according to claim 1, wherein establishing the time-address mapping comprises determining the reference address written to at the time indicated by the reference time value.

8. The method according to claim 1, wherein establishing the time-address mapping comprises setting the reference address to be written to at the time indicated by the reference time value.

9. The method according to claim 1, wherein establishing the time-address mapping comprises successively establishing multiple time-address mappings, and wherein the method further comprises determining from a first and a second time-address mapping a timing offset between internal timing and cell timing, wherein the address of the data block is determined based on the timing offset.

10. The method according to claim 9, wherein determining a timing offset comprises determining at least one of:
a timing offset between internal timing and serving cell timing, and
one or more timing offsets between internal timing and one or more neighbouring cell timings.

11. The method according to claim 1, further comprising establishing a time- address mapping indicative of an association of a reference time value of the internal clock with an address of a data block in the reception data buffer.

12. The method according to claim 1, wherein initiating the block-wise reading from the reception data buffer is performed asynchronously to writing to the reception data buffer.

13. The method according to claim 12, wherein writing the received data samples to the reception data buffer and initiating the block-wise reading of the data blocks therefrom are performed after performing an analog-to-digital conversion of the received data signal and before demodulating a data block read from the reception data buffer.

14. The method according to claim 1, wherein a read pointer indicative of an address of the data block to be read from the reception data buffer is set forward or backward in time.

15. The method according to claim 14, wherein the read pointer is set forward or backward according to a serving cell timing or a neighbouring cell timing.

16. A terminal device configured to control synchronization with a wireless network, comprising:
a radio receiver configured to receive a data signal comprising a representation of at least one data block from the network over a radio interface;
a control unit associated with a reception data buffer configured to write data samples obtained from the received signal to the reception data buffer;
a cell finder configured to detect a predefined synchronization pattern in the data samples written to the reception data buffer; and
a control processor configured to:
determine a reference time value of an internal clock based on an address of the detected synchronization pattern and to establish a time-address mapping indicative of an association of the reference time value of the internal clock of the terminal device with a reference address of the detected synchronization pattern;
determine an address of one or more data samples representing the received at least one data block in the reception data buffer based on the time-address mapping; and
initiate a block-wise reading of the at least one data block from the reception data buffer based on the determined address.

17. The terminal device according to claim 16, wherein the reception data buffer is a circular buffer.

18. The terminal device according to claim 16, further comprising a First-In- First-Out ("FIFO") buffer configured to continuously collect data samples and to write the collected data samples burst-wise to the reception data buffer.

19. A terminal device configured to control synchronization with a wireless network, comprising:
a radio receiver configured to receive a downlink data signal;
an analog-to-digital converter configured to convert the received data signal into a digital signal;
a reception data buffer configured to buffer digital data samples associated with the digital signal;
a clock system configured to provide timing references;
a timing event generator configured to provide a trigger signal to a control unit associated with the reception data buffer;
a cell finder configured to detect a predefined synchronization pattern in the data samples written to the reception data buffer;
a control processor configured to determine a reference time value of an internal clock based on an address of the detected synchronization pattern and to establish a time-address mapping indicative of an association of the reference time value of the internal clock with the reference address of the synchronization pattern in the reception data buffer;
a demodulator configured to demodulate data blocks read from the reception data buffer;
a modulator configured to modulate data to be transmitted to the network;
a transmission data buffer configured to buffer digital data samples received from the modulator;
a digital-to-analog converter configured to convert digital data samples read from the transmission data buffer into an analog signal;
a radio transmitter configured to transmit the analog signal in the uplink; and
a processor configured to control synchronization of the terminal device with the network by establishing a time-address mapping indicative of an association of a reference time value of the clock system with a reference address in at least one of the reception data buffer and the transmission data buffer.

* * * * *

UNITED STATES PATENT AND TRADEMARK OFFICE
CERTIFICATE OF CORRECTION

PATENT NO. : 8,693,460 B2  
APPLICATION NO. : 13/061908  
DATED : April 8, 2014  
INVENTOR(S) : Lipka et al.

Page 1 of 1

It is certified that error appears in the above-identified patent and that said Letters Patent is hereby corrected as shown below:

In the Drawings

In Fig. 6, Sheet 6 of 12, delete "  " and insert therefor --  --

In Fig. 11, Sheet 11 of 12, Tag "1102", delete "Modulator)" and insert therefor -- Modulator --

In the Specification

Column 6, line 44, delete "initate" and insert therefor -- initiate --

Column 9, line 49, delete "aprimary" and insert therefor -- a primary --

Column 16, line 9, delete "exemplary" and insert therefor -- exemplarily --

Column 17, line 3, delete "822" and insert therefor -- 822. --

Column 17, line 13, delete "digitzed" and insert therefor -- digitized --

Column 20, line 16, delete "exemplary" and insert therefor -- exemplarily --

Column 21, line 4, delete "exemplary" and insert therefor -- exemplarily --

Column 21, line 5, delete "smaller then" and insert therefor -- smaller than --

Signed and Sealed this  
Twenty-third Day of December, 2014

Michelle K. Lee  
*Deputy Director of the United States Patent and Trademark Office*